(12) United States Patent
Van Der Weijde et al.

(10) Patent No.: US 12,508,929 B2
(45) Date of Patent: Dec. 30, 2025

(54) METHOD FOR CONTROLLING CHARGING INFRASTRUCTURE WITH A ROBOTIC CHARGING INTERFACE

(71) Applicant: ROCSYS B.V, Rijswijk (NL)

(72) Inventors: Johannes Oosten Van Der Weijde, Rijswijk (NL); Kanter Van Deurzen, Rijswijk (NL); Crijn Bouman, Rijswijk (NL)

(73) Assignee: Rocsys B.V., Rijswijk (NL)

( * ) Notice: Subject to any disclaimer, the term of this patent is extended or adjusted under 35 U.S.C. 154(b) by 720 days.

(21) Appl. No.: 17/798,333

(22) PCT Filed: Feb. 19, 2021

(86) PCT No.: PCT/NL2021/050115
§ 371 (c)(1),
(2) Date: Aug. 9, 2022

(87) PCT Pub. No.: WO2021/167462
PCT Pub. Date: Aug. 26, 2021

(65) Prior Publication Data
US 2023/0108220 A1 Apr. 6, 2023

(30) Foreign Application Priority Data
Feb. 20, 2020 (NL) .................................... 2024952

(51) Int. Cl.
*B60L 53/37* (2019.01)
*B25J 9/16* (2006.01)
*B60L 53/14* (2019.01)

(52) U.S. Cl.
CPC ............. *B60L 53/37* (2019.02); *B25J 9/1687* (2013.01); *B60L 53/14* (2019.02); *B60L 2250/10* (2013.01)

(58) Field of Classification Search
CPC .......... B60L 53/37; B60L 53/14; B60L 53/35; B25J 9/1687; B25J 9/0069; B25J 17/0208; B25J 9/0208; H01R 43/26
See application file for complete search history.

(56) References Cited

U.S. PATENT DOCUMENTS

| | | | | |
|---|---|---|---|---|
| 2008/0008573 | A1* | 1/2008 | Mitchell | B65G 61/00 414/791.6 |
| 2013/0076902 | A1* | 3/2013 | Gao | B25J 9/042 348/148 |

FOREIGN PATENT DOCUMENTS

| | | | |
|---|---|---|---|
| CN | 109866641 A | * | 6/2019 |
| DE | 102018104762 A1 | | 9/2019 |

(Continued)

OTHER PUBLICATIONS

CN-109866641-A Machine Translation (Year: 2025).*
Search Report & Written Opinion dated Sep. 10, 2021, Application No. PCT/NL2021/050115.

*Primary Examiner* — David V Henze-Gongola
(74) *Attorney, Agent, or Firm* — The Dobrusin Law Firm, P.C.

(57) ABSTRACT

The invention relates to a method for controlling a charging infrastructure comprising a charging station for charging a vehicle having a vehicle-side charging interface, wherein the charging station comprises a robot that carries a robot-side charging interface for establishing a charging connection with the vehicle-side charging interface, wherein the robot comprises a main base and a compliance assembly that is arranged kinematically between the main base and the robot-side charging interface for providing a compliance, wherein the method comprises in series a positioning phase in which the robot-side charging interface is moved to an initial connecting position, and a connecting phase in which the robot-side charging interface establishes a charging (Continued)

connection with the vehicle-side charging interface, wherein in the positioning phase a compliance value is compared with a positioning intervention value and a positioning instruction is changed when the compliance value exceeds a positioning intervention value, and in the connecting phase the compliance value is compared with a connecting intervention value and a connecting instruction is changed when the compliance value exceeds the connecting intervention value, wherein the positioning intervention value differs from the connecting intervention value.

22 Claims, 17 Drawing Sheets

(56) References Cited

FOREIGN PATENT DOCUMENTS

| | | |
|---|---|---|
| EP | 2500150 A2 | 9/2012 |
| WO | 2013/055204 A1 | 4/2013 |

\* cited by examiner

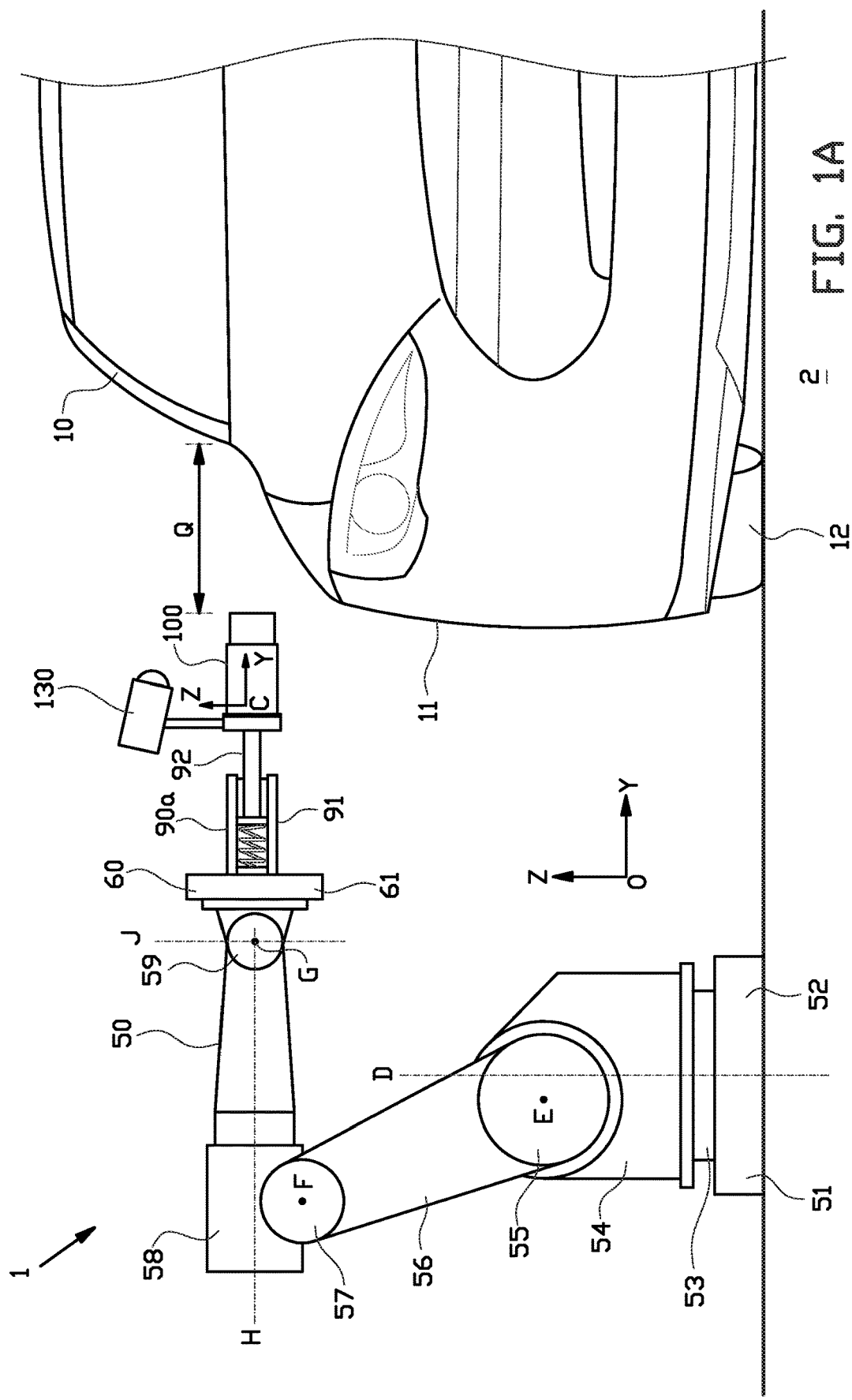

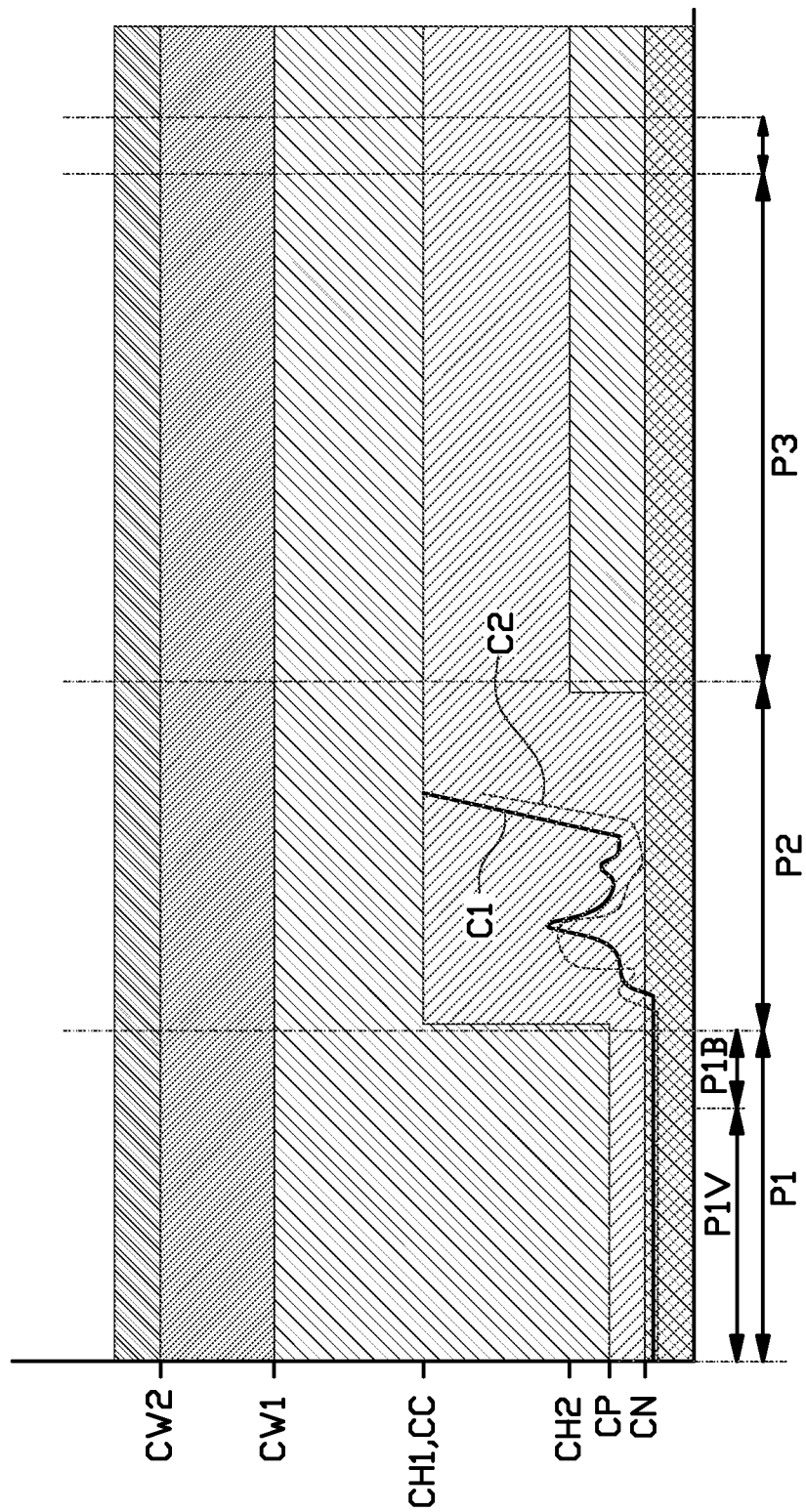

METHOD FOR CONTROLLING CHARGING INFRASTRUCTURE WITH A ROBOTIC CHARGING INTERFACE

BACKGROUND

The invention relates to a method for controlling a charging infrastructure comprising a charging station for charging a vehicle having a vehicle-side charging interface, and a robot that carries a robot-side charging interface for establishing a charging connection with the vehicle-side charging interface.

Furthermore, the invention relates to a charging infrastructure comprising a charging station for charging a vehicle having a vehicle-side charging interface, and a robot that carries a robot-side charging interface for establishing a charging connection with the vehicle-side charging interface.

SUMMARY OF THE INVENTION

Electrically powered vehicles have to be charged frequently by connecting them with a battery charger. In recent years, attempts have been made to automate the establishment of the connection, for example by implementing a fast moving and accurate robot that is programmed to bring the robot-side charging interface into the vehicle-side interface. However, this complex peg-in-hole task requires a highly accurate and therefore expensive robot-implementation for each charging infrastructure, wherein the robot may still not be suitable for safely handling irregularities such as deviations in the position of the vehicle-side charging interface or unexpected physical contact with objects between the robot-side interface and the vehicle-side interface.

It is an object of the present invention to provide a charging infrastructure with a robot and a method of controlling that charging infrastructure that can safely handle irregularities as described above.

According to a first aspect, the invention provides a method for controlling a charging infrastructure comprising a charging station for charging a vehicle having a vehicle-side charging interface, wherein the charging station comprises a robot that carries a robot-side charging interface for establishing a charging connection with the vehicle-side charging interface, wherein the robot comprises a main base, a displacement mechanism between the main base and the robot-side charging interface for moving the robot-side charging interface with at least three degrees of freedom with respect to the main base, wherein the displacement mechanism comprises at least one actuator that is configured for imposing a displacement between the main base and the robot-side charging interface over a displacement stroke when the actuator is actuated, wherein the robot comprises a compliance assembly that is arranged kinematically in series with an actuator between the main base and the robot-side charging interface, wherein the compliance assembly is configured for providing a compliance by resiliently absorbing or releasing a displacement between the base frame and the robot-side charging interface over a compliance stroke, wherein the method comprises in series a positioning phase in which the robot-side charging interface is moved from a retracted position in which the vehicle can enter or exit the charging station, to an initial connecting position in which the robot-side charging interface is in front of and preferably aligned with the vehicle-side charging interface, a connecting phase in which the robot-side charging interface establishes a charging connection with the vehicle-side charging interface from the initial connecting position, a charging phase in which the vehicle is charged by a charging current through the robot-side charging interface, and a disconnecting phase in which the robot-side charging interface disengages from the vehicle-side charging interface and is retracted towards the retracted position, wherein in the positioning phase the actuator is powered according to a positioning instruction, the compliance is monitored, a compliance value is compared with a positioning intervention value and the positioning instruction is changed when the compliance value exceeds the positioning intervention value, and wherein in the connecting phase the actuator is powered according to a connecting instruction, the compliance is monitored, the compliance value is compared with a connecting intervention value and the connecting instruction is changed when the compliance value exceeds the connecting intervention value, wherein the positioning intervention value differs from the connecting intervention value.

The charging infrastructure according to the invention comprises a robot that has an actuator to move the robot-side charging interface, and a compliance assembly that is kinematically in series therewith to absorb a fraction of the movement of the actuator. The compliance can quickly absorb a collision of the robot-side interface with an unexpected physical object while the actuator is still powered, which gives the control system time to respond, and the compliance can be used to allow the robot-side charging interface to establish the correct charging connection with the vehicle-side charging interface by passively compensating for robot inaccuracies. During the positioning phase the compliance value is compared with the positioning intervention value and during the connecting phase the compliance value is compared with the connecting intervention value that differs from the positioning intervention value. Therefore during the positioning phase the robot may be highly sensitive for any unexpected collision, while during the connecting phase, when there is intentional physical contact, a higher value may be allowed, for example to overcome friction between the robot-side charging interface and the vehicle-side charging interface that comes with the establishment of the connection, but prevent damage through clamping. This can provide a robot that can safely operate in a public area.

In an embodiment the positioning intervention value is smaller than the connecting intervention value.

In a practical embodiment the positioning intervention value is smaller than 50% of the connecting intervention value.

In a preferred practical embodiment the positioning intervention value is smaller than 25% of the connecting intervention value.

In an embodiment the positioning instruction is changed to stop the actuation of the actuator when the compliance value exceeds the positioning intervention value, whereby a compression force as exercised by the robot-side charging interface remains limited to the amount as absorbed by the compliance assembly.

In an embodiment the positioning instruction is aborted when the compliance value exceeds the positioning intervention value and the actuator is powered according to a retraction instruction to retract the robot-side charging interface towards the retracted position.

In an embodiment the connecting instruction is changed to stop the actuation of the actuator when the compliance value exceeds the connecting intervention value, whereby a certain amount of compression force as exercised by the robot-side charging interface is allowed in order to overcome the friction between the robot-side charging interface and the vehicle-side charging interface that comes with the establishment of the connection, but prevent damage through clamping which might be the case when the compliance value exceeds the connecting intervention value.

In an embodiment the connecting instruction is aborted when the compliance value exceeds the connecting intervention value and the actuator is powered according to a retraction instruction to retract the robot-side charging interface towards the retracted position or to the initial connecting position.

In an embodiment in the charging phase the actuator is powered according to a charging instruction and the compliance is monitored, wherein the charging instruction defines that the compliance value is brought between a first charging intervention value and a lower second charging intervention value. In particular, in the charging phase the actuator is powered according to the charging instruction at the beginning of the charging phase, and the actuator is idling, preferably, for the remaining of the charging phase, when the compliance value is between the first charging intervention value and the lower second charging intervention value. The compliance assembly is then balanced to a compliance value between the first charging intervention value and the second charging intervention value. Unexpected movements of the vehicle-side charging interface can then passively be followed by the robot-side charging interface, without violating the intervention values. Such unexpected movements can for example be caused by persons stepping out of the vehicle.

In an embodiment thereof the actuator is powered according to the charging instruction to bring the compliance value between the first charging intervention value and the second charging intervention value when the compliance value exceeds the first charging intervention value or comes below the second charging intervention value, whereby the charging can continue in a safe manner.

In an embodiment, in the positioning phase, in the connecting phase and in the charging phase the actuator can be powered according to an intervention instruction and the compliance value is monitored, wherein the compliance value is compared with a warning intervention value, wherein, when the warning intervention value is exceeded, an intervention instruction is started that is selected from the group comprising:
 interruption of a charging current through the robot-side charging interface;
 triggering an audio alarm;
 triggering a visual alarm;
 communicating an alarm state to a vehicle or a higher-level management system;
 triggering a mechanical breakout release; and
 retraction of the robot-side charging interface from the vehicle-side charging interface.

In an embodiment, in the positioning phase, the warning intervention value is higher than the positioning intervention value; in the connecting phase, the warning intervention value is higher than the connecting intervention value; and/or in the charging phase, the warning intervention value is higher than the first charging intervention value or lower than second charging intervention value, or the warning intervention value has a first warning intervention value higher than the first charging intervention value, and a second warning intervention value lower than the second charging intervention value.

In an embodiment the positioning phase comprises the steps of determining the position of the vehicle-side charging interface and determining the initial connecting position by adding the cumulative system inaccuracies to or subtracting it from the determined position of the vehicle-side charging interface. It is noted that the inventors have found that it is advantageous when there is no physical contact between the robot-side charging interface and the vehicle-side charging interface, when the robot-side charging interface is in or approaches the initial connecting position. Damage to the vehicle caused by the robot-side charging interface moving into the initial connecting position, therefore, may be prevented from occurring.

According to a second aspect, the invention provides a method for controlling a charging infrastructure comprising a charging station for charging a vehicle having a vehicle-side charging interface, wherein the charging station comprises a robot that carries a robot-side charging interface for establishing a charging connection with the vehicle-side charging interface, wherein the robot comprises a main base, a displacement mechanism between the main base and the robot-side charging interface for moving the robot-side charging interface with at least three degrees of freedom with respect to the main base, wherein the displacement mechanism comprises at least one actuator that is configured for imposing a displacement between the main base and the robot-side charging interface over a displacement stroke when the actuator is actuated, wherein the robot comprises a compliance assembly that is arranged kinematically in series with an actuator between the main base and the robot-side charging interface, wherein the compliance assembly is configured for providing a compliance by resiliently absorbing or releasing a displacement between the base frame and the robot-side charging interface over a compliance stroke, wherein the method comprises in series a positioning phase in which the robot-side charging interface is moved from a retracted position in which the vehicle can enter or exit the charging station, to an initial connecting position in which the robot-side charging interface is in front of and preferably aligned with the vehicle-side charging interface, a connecting phase in which the robot-side charging interface establishes a charging connection with the vehicle-side charging interface from the initial connecting position, a charging phase in which the vehicle is charged by a charging current through the robot-side charging interface, and a disconnecting phase in which the robot-side charging interface disengages from the vehicle-side charging interface and is retracted towards the retracted position, wherein in the charging phase the actuator is powered according to a charging instruction and the compliance is monitored, wherein the charging instruction defines that the compliance value is brought between a first charging intervention value and a lower second charging intervention value.

In an embodiment thereof, in the charging phase, the actuator is powered according to the charging instruction at the beginning of the charging phase, and the actuator is idling, preferably, for the remaining of the charging phase, when the compliance value is between the first charging intervention value and the lower second charging intervention value.

In a further embodiment thereof the actuator is powered according to the charging instruction to bring the compliance value between the first charging intervention value and the second charging intervention value when the compliance value exceeds the first charging intervention value or comes below the second charging intervention value.

In an embodiment, in the positioning phase, in the connecting phase and in the charging phase the actuator can be powered according to an intervention instruction and the compliance value is monitored, wherein the compliance value is compared with a warning intervention value, wherein, when the warning intervention value is exceeded, an intervention instruction is started that is selected from the group comprising:

interruption of a charging current through the robot-side charging interface;
triggering an audio alarm;
triggering a visual alarm;
communicating an alarm state to a vehicle or a higher-level management system;
triggering a mechanical breakout release; and
retraction of the robot-side charging interface from the vehicle-side charging interface.

In an embodiment, in the positioning phase, the warning intervention value is higher than the positioning intervention value; in the connecting phase, the warning intervention value is higher than the connecting intervention value; and/or in the charging phase, the warning intervention value is higher than the first charging intervention value or lower than second charging intervention value, or the warning intervention value has a first warning intervention value higher than the first charging intervention value, and a second warning intervention value lower than the second charging intervention value.

According to a third aspect, the invention provides a charging infrastructure comprising a charging station for charging a vehicle having a vehicle-side charging interface, wherein the charging station comprises a robot that carries a robot-side charging interface for establishing a charging connection with the vehicle-side charging interface, wherein the robot comprises a main base, a displacement mechanism between the main base and the robot-side charging interface for moving the robot-side charging interface with at least three degrees of freedom with respect to the main base, wherein the displacement mechanism comprises at least one actuator that is configured for imposing a displacement between the main base and the robot-side charging interface over a displacement stroke when the actuator is actuated, wherein the robot comprises a compliance assembly that is arranged kinematically in series with an actuator between the main base and the robot-side charging interface, wherein the compliance assembly is configured for providing a compliance by resiliently absorbing or releasing a displacement between the base frame and the robot-side charging interface over a compliance stroke, wherein the charging infrastructure further comprises a controller operatively connected to at least the robot and being configured for performing the method according to the first aspect or the second aspect of the invention.

According to a fourth aspect, the invention provides a computer-readable medium having instructions thereon, which, when executed by a controller or a processor, cause the charging infrastructure according to the third aspect of the invention to perform the method according to the first aspect or the second aspect of the invention.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIGS. 1A, 1B and 1C respectively are a side view, and an isometric rear view and an isometric front view of details of a charging station with a robot according to a first embodiment of the invention having a robot-side charging interface for establishing a charging connection with a vehicle-side charging interface of an electrically powered vehicle;

FIGS. 6A-6F are charts that illustrate the monitoring of the establishment of the charging connection by means of the compliance assembly as shown in FIG. 4, and different possible responses thereto.

DETAILED DESCRIPTION OF THE INVENTION

Figure 1B:
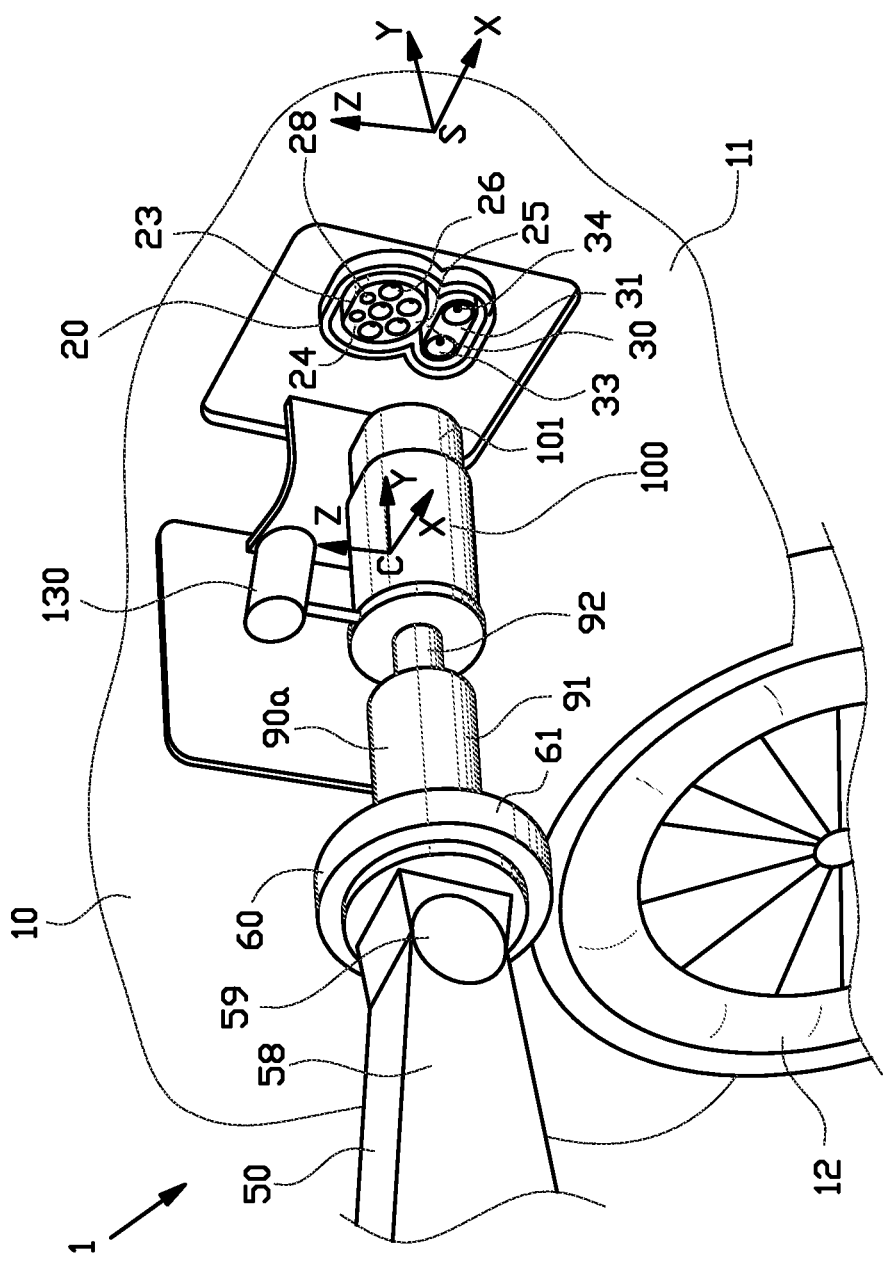
Figure 1C:
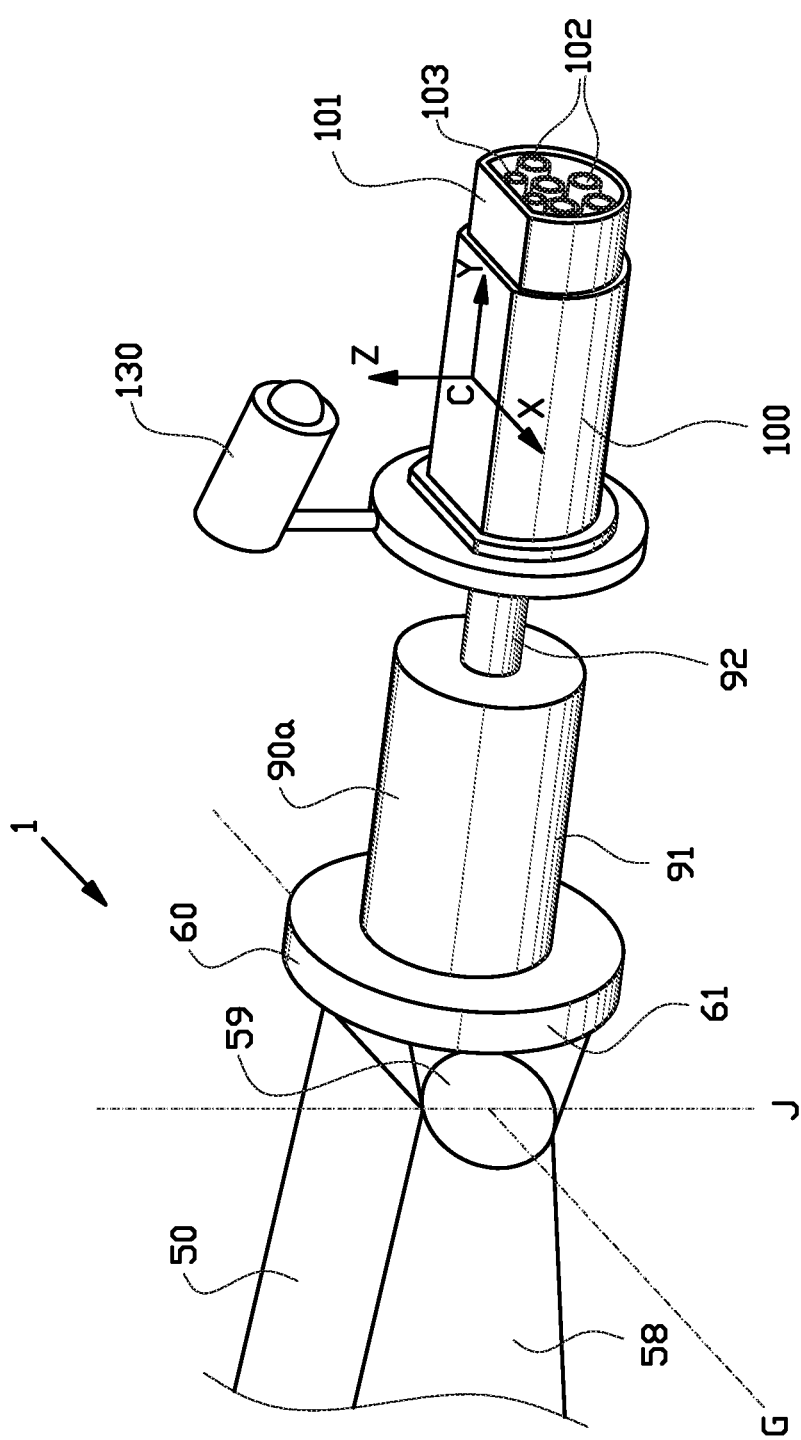

FIGS. 1A, 1B and 1C show a charging station 1 according to a first embodiment of the invention. The charging station 1 has a vehicle area 2 for electrically charging an electrically powered vehicle 10, in this example a passenger car. The vehicle 10 may be fully electrically powered or it may have a hybrid drive in which an electric drive is combined with fuel combustion. The vehicle 10 has a vehicle body 11 on wheels 12 and a vehicle-side charging interface 20 carried by the vehicle body 11, in this example on the right side of the vehicle body 11 above one of the rear wheels 12.

As shown in FIGS. 1A, 1B and 1C the charging station 1 comprises a robot 50 having a robot-side charging interface 100 for establishing a charging connection with the vehicle-side charging interface 20. The robot-side charging interface 100 is electrically connected with a not shown battery charger.

Figure 5A:
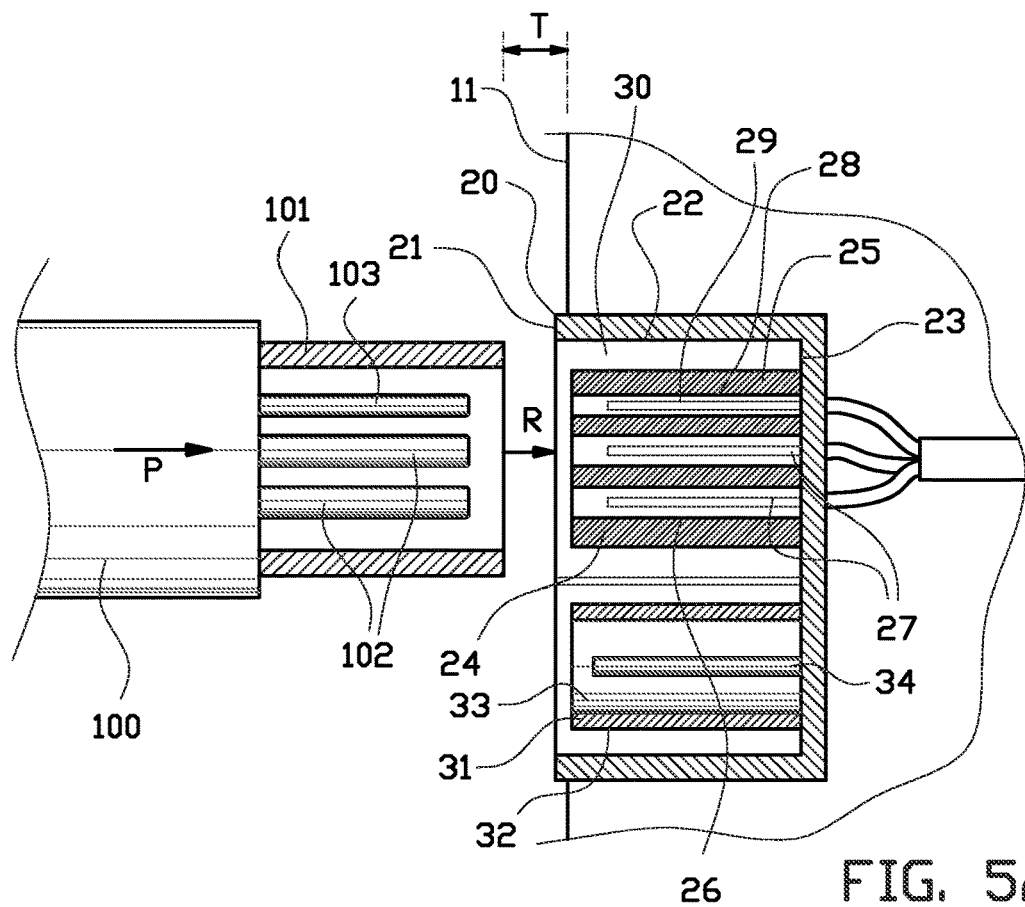
FIG. 5A is a partial longitudinal section of the robot-side charging interface and the vehicle-side charging interface as shown in FIGS. 1B, 2B and 3B that are properly aligned just before establishing the charging connection.

The specific pinout of the robot-side charging interface 100 and the vehicle side charging interface 20 may be of any known type as described in official standards such as the IEC/SAE standards. The robot-side charging interface 100 and the vehicle side charging interface 20 may be of the so called Mennekes, Yazaki, Schuko or Combo type, or any other special purpose connector for electric vehicle charging. As shown in FIGS. 1B and 5A, the vehicle-side charging interface 20 is in this example a Combo CCS-2 inlet that accepts both normal charging and high speed charging. The vehicle-side charging interface 20 comprises a front surface 21 that merges inwardly into a circumferential inner surface 22. The inner surface 22 merges into a bottom surface 23 from which a first socket 24 and a second socket 31 project. The first socket 24 comprises a socket body 25 of electrically isolating material having five first channels 26 in which five recessed normal charging connectors 27 extend, and two second channels 28 in which in two control connectors 29 extend. The second socket 31 comprises a socket body 32 of electrically insulating material having two third channels 33 in which two high speed charging connectors 34 extend. The inner surface 22 and the socket bodies 25, 34 together define a slot 30 around the sockets 24, 31. The slot 30, the first channels 26, the second channels 28 and the third channels 33 have a receiving direction R that is by design parallel to the first channels 26, the second channels 28 and the third channels 33.

As shown in FIGS. 1C and 5A, the robot-side charging interface 100 is in this example of the so called Mennekes type (type 2 connector under IEC 62196) for normal charging. The robot-side charging interface 100 comprises a shield 101 that mates with and fits inside the slot 30 of the vehicle-side charging interface 20, and multiple first bushes 102 and second bushes 103 that mate with and fit inside the respective first channels 26 and second channels 28 of the vehicle-side charging interface 20. The robot-side charging interface 100 comprises charging connectors that are recessed inside the bushes 102, 103 and that are electrically connected with the connectors 27, 29 of the vehicle-side charging interface 20 when the charging connection is established. The shield 101, the first bushes 102 and the second bushes 103 have an insert direction P that is by design parallel with the charging connectors. The insert direction P is by design perfectly parallel to and aligned with the receiving direction R of the vehicle-side charging interface 20.

The vehicle-side charging interface 20 and the robot-side charging interface 100 typically have a very precisely fitting geometry that allows at the initial mutual contact only a slight misalignment transverse to the receiving direction R of about maximal 0.1-0.3 millimeters, or a slight misalignment of maximal 1-2 degrees when manually plugged into each other. Due to the self-searching shape features of the charging interfaces 20, 100 such minimal misalignments are automatically corrected, whereby the charging interfaces 20, 100 come into proper mutual engagement. The connectors 27, 29, 34 of the vehicle-side charging interface 20 and the connectors 102, 103 of the robot-side charging interface 100 may have different lengths or positions in the insert direction P and receiving direction R to impose a default mating sequence between the contacting connectors, even when they have abovementioned slight misalignments. This ensures for example that a ground connection or a control connection is established before the power connections are made. The vehicle side charging interface 20 is inserted in insert direction P into the vehicle side charging interface 100 over an insert stroke that ends when the design depth for proper insertion is reached. The vehicle-side charging interface 20 and the robot-side charging interface 100 are provided with a remote controlled lock for locking the vehicle side charging interface 20 at its design depth. This is to physically prevent disengagement of the properly connected charging interfaces 20, 100 during the application of the high charging current.

As shown in FIG. 1A, the robot 50 of the charging station 1 comprises a schematically illustrated pedestal or main base 51 having a main frame 52 that is in this example located on the ground aside the vehicle area 2 at the side close to the vehicle-side charging interface 20. The robot 50 can be located at any side, or at the front side or at the back side of the vehicle 10 depending on the location of the vehicle-side charging interface 20. Alternatively the robot 50 is positioned on or under the floor to reach a vehicle-side charging interface 20 at the bottom side of the vehicle 10, or the robot 50 is suspended above the vehicle 10 to reach a vehicle-side charging interface 20 at the top side or on the roof of the vehicle 10.

As shown in FIGS. 1A-1C, the robot 50 comprises a moveable carrier 60 having a carrier frame 61 that carries the robot-side charging interface 100. The robot 50 can be of any configuration that enables the moveable carrier 60 and thereby the robot-side charging interface 100 to be moved with respect to the main base 51. Mathematically a Cartesian coordinate system O is defined that is coupled to the main base 51 to which the position of the robot-side charging interface 100 is related. The robot-side charging interface 100 can be translated in any of the three orthogonal directions X, Y, Z (lateral, longitudinal and vertical) and can be rotated with respect to the main base 51 around these axis (pitch, roll, yaw), in total six degrees of freedom (6-DOF), or less depending on the specific drive chain configuration thereof.

In this example the robot 50 comprises a robot base 54 that is via a first rotation actuator 53 connected with the main frame 52 to rotate around a vertical first axis D, corresponding to the Z axis of the Cartesian coordinate system O. The robot 50 comprises a first robot arm 56 that is at one end via a second rotation actuator 55 connected with the robot base 54 to rotate with respect to the main frame 52 around a horizontal second axis E. The first robot arm 56 is at its opposite end via a third rotation actuator 57 connected with one end of a second robot arm 58 to rotate the second arm 58 with respect to the first arm 56 around a third horizontal axis F. The opposite end of the second robot arm 58 is via a fourth rotation actuator 59 connected with the moveable carrier 60 to rotate the moveable carrier 60 with respect to the second arm 58 around a horizontal fourth axis G, and around a fifth axis H and a sixth axis J that are orthogonal to each other.

Figure 4:
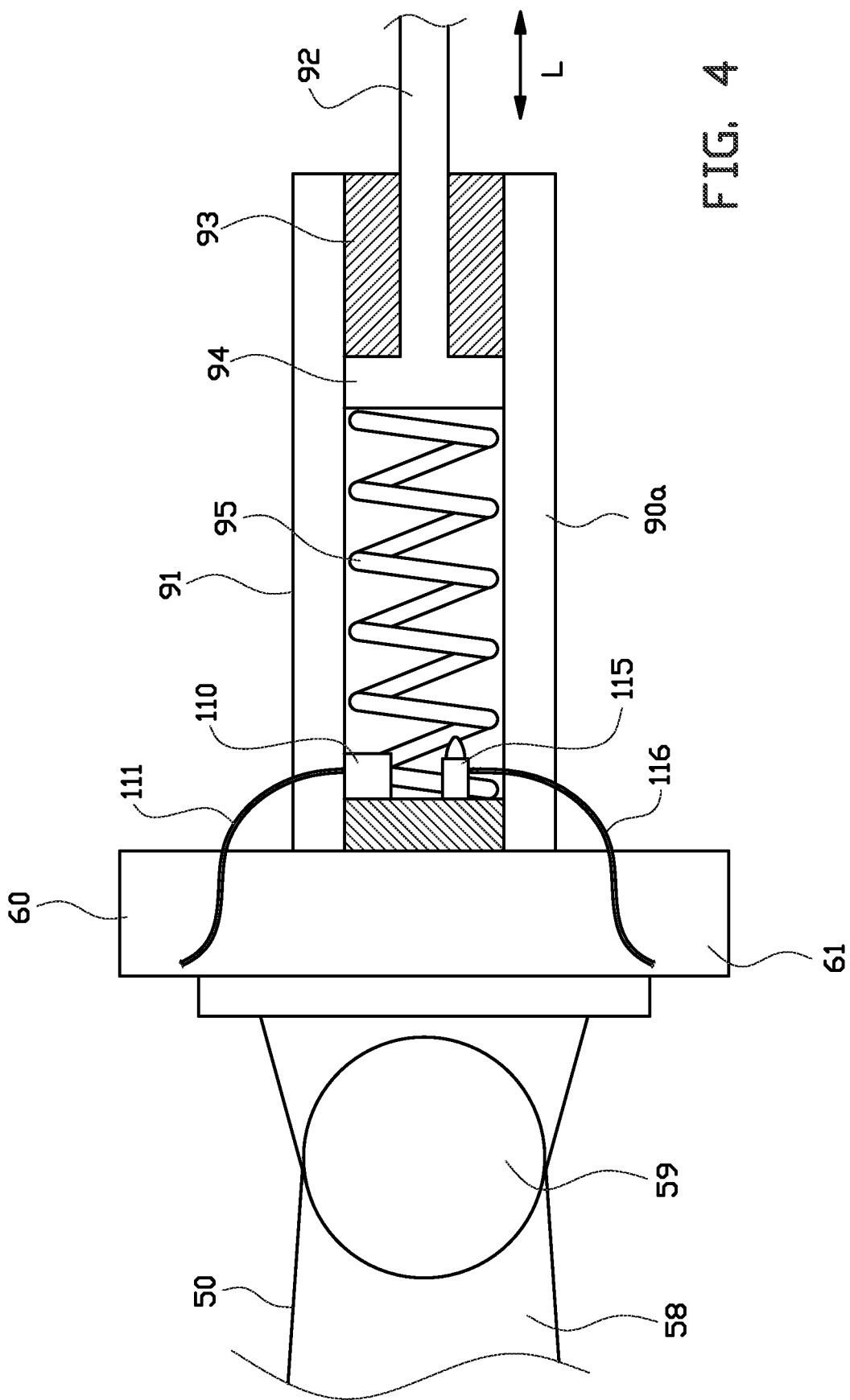
FIG. 4 is a longitudinal section of a compliance assembly of the robot as shown in FIGS. 1A, 1B, 1C or of the robot as shown in FIGS. 2A and 2B or of the robot as shown in FIGS. 3A and 3B.

As best shown in FIG. 4, the robot 50 comprises a first compliance assembly 90a that is in series between the moveable carrier 60 and the robot-side charging interface 100, and thereby kinematically in series with the robot-side charging interface 100 and at least one of the rotation actuators 53, 55, 57, 59 of the drive chain. Mathematically a Cartesian coordinate system C is defined that is coupled to the robot-side charging interface 100 and from which the compliance is related, wherein the Y-axis is preferably parallel to the insert direction P. The compliance assembly 90a provides mechanical compliance between the drive chain and the robot-side charging interface 100.

In this example the compliance assembly 90a comprises an outer tube 91 that is mounted to the carrier frame 61 and a connecting rod 92 that is rectilinearly guided inside the outer tube 91, in this example by means of a slide bearing 93. The connecting rod 92 partly projects from the outer tube 91, and the first compliance assembly 90a comprises in this example an end stop 94 at the end of the connecting rod 92 that remains behind the slide bearing 93 to determine a defined outermost position of the connecting rod 92 with respect to the carrier frame 61, and a reversible flexible element, in this example a spring, in particular a coil spring 95 between the end stop 94 and the carrier frame 61 that is biased to keep the end stop 94 in abutment with the slide bearing 93. By means of the coil spring 95 the connecting rod 92 can resiliently and reversibly slide back in direction L towards the moveable carrier 60 over a compliance stroke, in this example when a defined threshold force is exceeded that overcomes the bias of the coil spring 95. The first compliance assembly 90*a* therefore provides a first compliance in direction L. The rotation actuators 53, 55, 57, 59 impose displacements onto the robot-side charging interface 100 that are followed by the robot-side charging interface 100 as long as the threshold forces on the compliance assembly 90*a* is not exceeded.

In the described embodiment the first compliance assembly 90*a* is biased to and against the slide bearing 93. Alternatively, the coil spring 95 or any other resilient element provides resilience in opposite directions with or without implementing a threshold force, whereby the connecting rod 92 can resiliently and reversibly be pushed towards and pulled away from the moveable carrier 60. Both embodiments provide a compliance stroke in one degree of freedom.

As shown in FIG. 4, the first compliance assembly 90*a* comprises a schematically illustrated distance sensor 110 that is positioned and configured to provide an electric signal via a first electric cable 111. This electrical signal is indicative for the distance of the end stop 94 with respect to the moveable carrier frame 61, and therefore for the length of the first compliance in direction L and for the external force that is exerted in that direction L. The first compliance assembly 90*a* comprises an end switch 115 that is positioned and configured to detect the abutment of the end stop 94, which indicates the situation in which the maximum length of the first compliance is reached. The end switch 115 then provides a corresponding signal via a second electric cable 116.

Figure 2A:
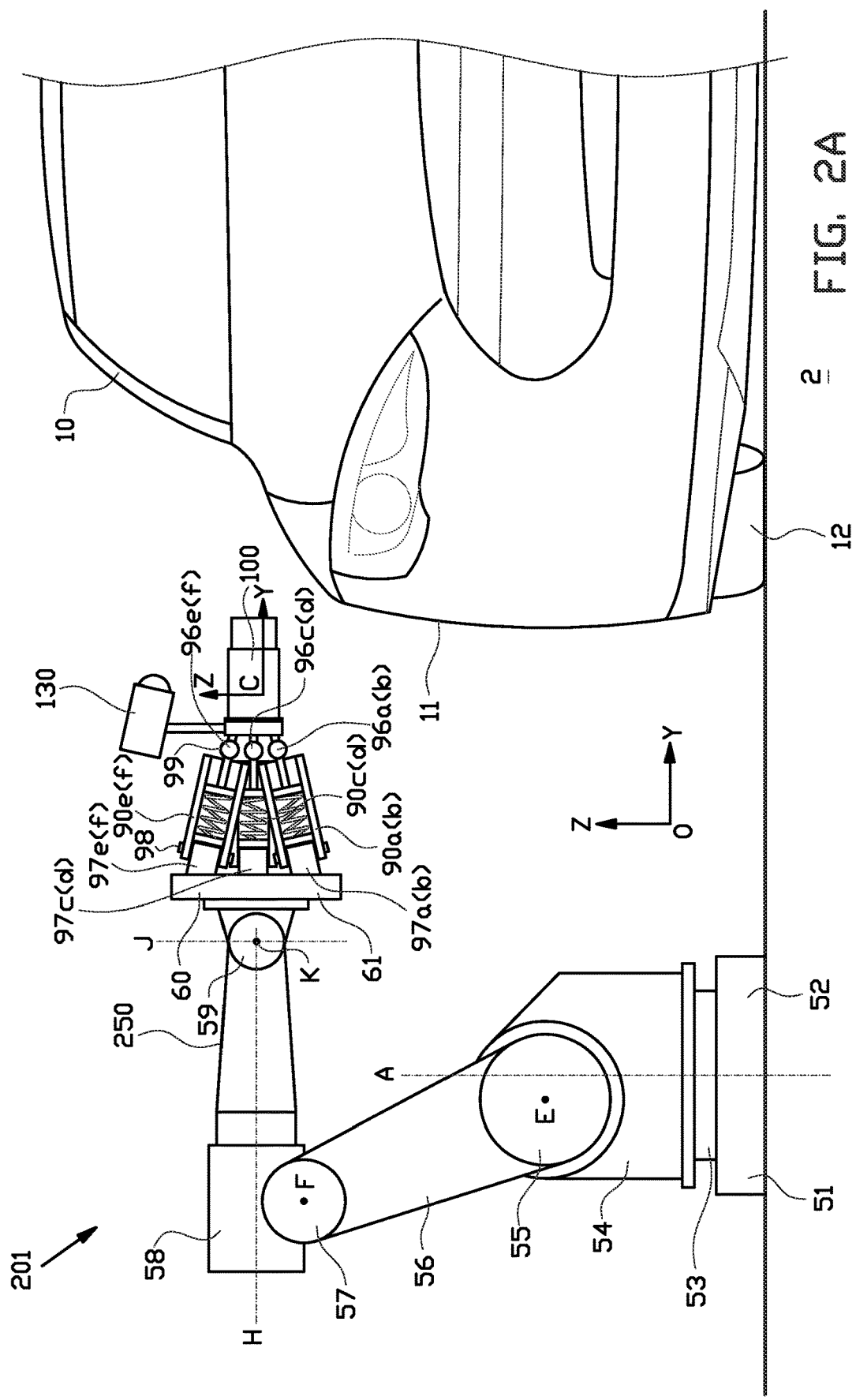
FIGS. 2A and 2B respectively are a side view, and an isometric view of details of a charging station with a robot according to a second embodiment of the invention having the robot-side charging interface for establishing the charging connection with the vehicle-side charging interface of the electrically powered vehicle.
Figure 2B:
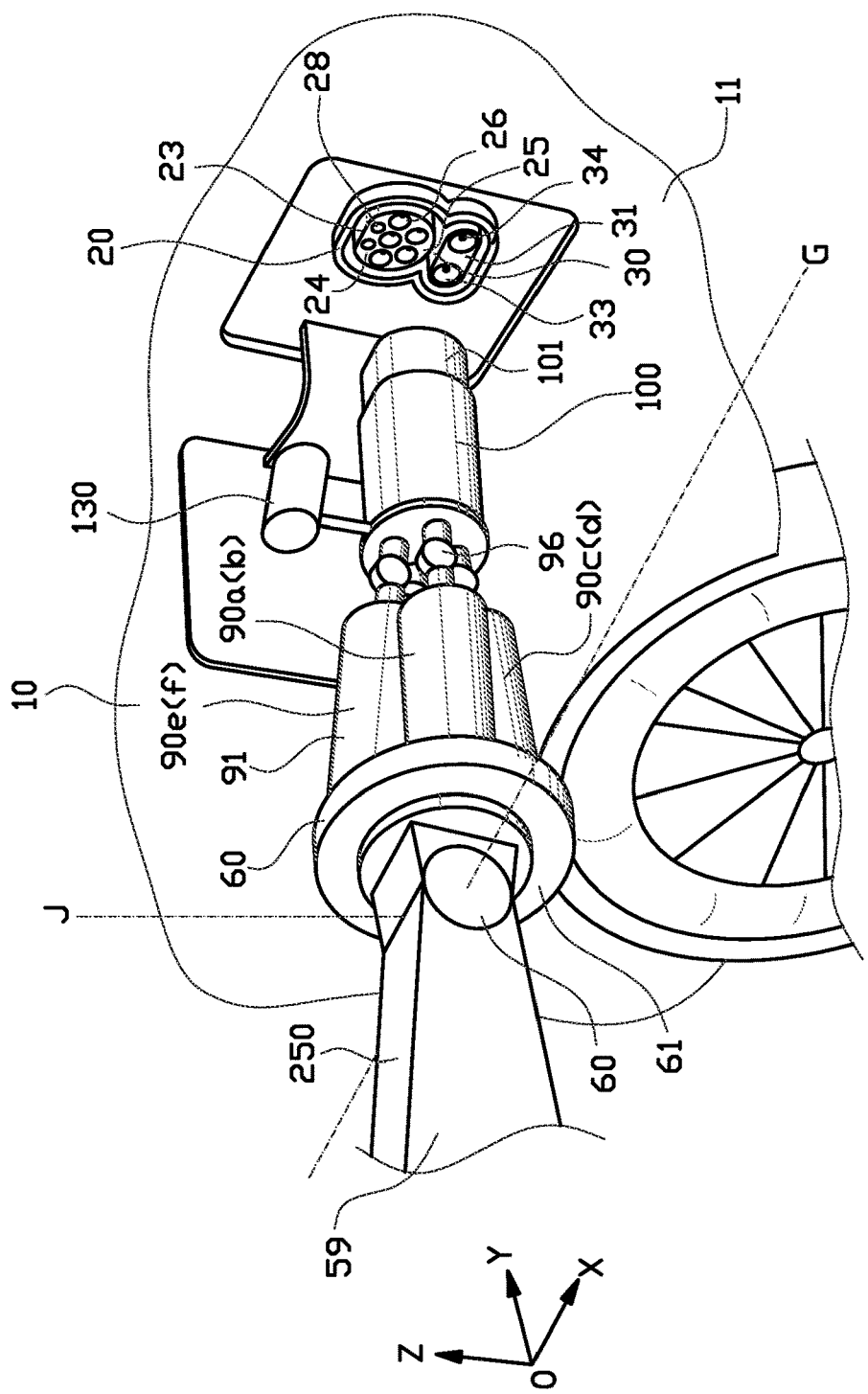

FIGS. 2A and 2B show a charging station 201 with a robot 250 according to a second embodiment of the invention. The parts that correspond with the first embodiment are provided with the same reference numbers. Only the deviating parts are discussed hereafter.

The robot 250 comprises multiple, in this embodiment six compliance assemblies 90*a*-90*f* between the moveable carrier 60 and the robot-side charging interface 100. In the figures only three of them are shown in detail. The moveable carrier 60 comprises in total six leg supports 97*a*-97*f* on the carrier frame 61 that are in a same plane and that form pairs in a triangular configuration. The robot 250 comprises in total six leg supports 96*a*-96*f* on the robot-side charging interface 100 that are in a same plane and that form pairs in a triangular configuration. The outer tubes 91 of the compliance assemblies 90*a*-90*f* are with first couplings 98 that are embodied as universal rotation joints having two degrees of freedom that are connected with the leg supports 97*a*-97*f* of the moveable carrier 60. The connecting rods 92 of the compliance assemblies 90*a*-90*f* are with second couplings 99 that are embodied as universal rotation joints having three degrees of freedom connected with the leg supports 96*a*-96*f* on the charging interface 100. The six compliance assemblies 90*a*-90*f* form in this example a hexapod mechanism between the robot-side charging interface 100 and the moveable carrier 60 providing compliance in six degrees of freedom. Alternatively formulated the six compliance assemblies 90*a*-90*f* form a Stewart-platform between the robot-side charging interface 100 and the moveable carrier 60. The compliance assemblies 90*a*-90*f* are thereby configured parallel to each other and in series with the robot-side charging interface 100 and at least one of the rotation actuators 53, 55, 57, 59 of the drive chain. The coil springs 95 in the individual compliance assemblies 90*a*-90*f* may have different impedances, in this example different stiffness to ensure a default position of the robot-side charging interface 100 with respect to the moveable carrier 60 without hanging down due to for example an uneven weight distribution following from the different individual weights of the various components present in the robot side charging interface 100 and in the compliance assemblies 90*a*-90*f*. Each compliance assembly 90*a*-90*f* is provided with the distance sensor 110 and the end switch 115. The rotation actuators 53, 55, 57, 59 impose displacements onto the vehicle-side charging interface 100 that are followed by the vehicle-side charging interface 100 as long as the threshold forces on any one of the compliance assemblies 90*a*-90*f* is not exceeded.

Figure 3A:
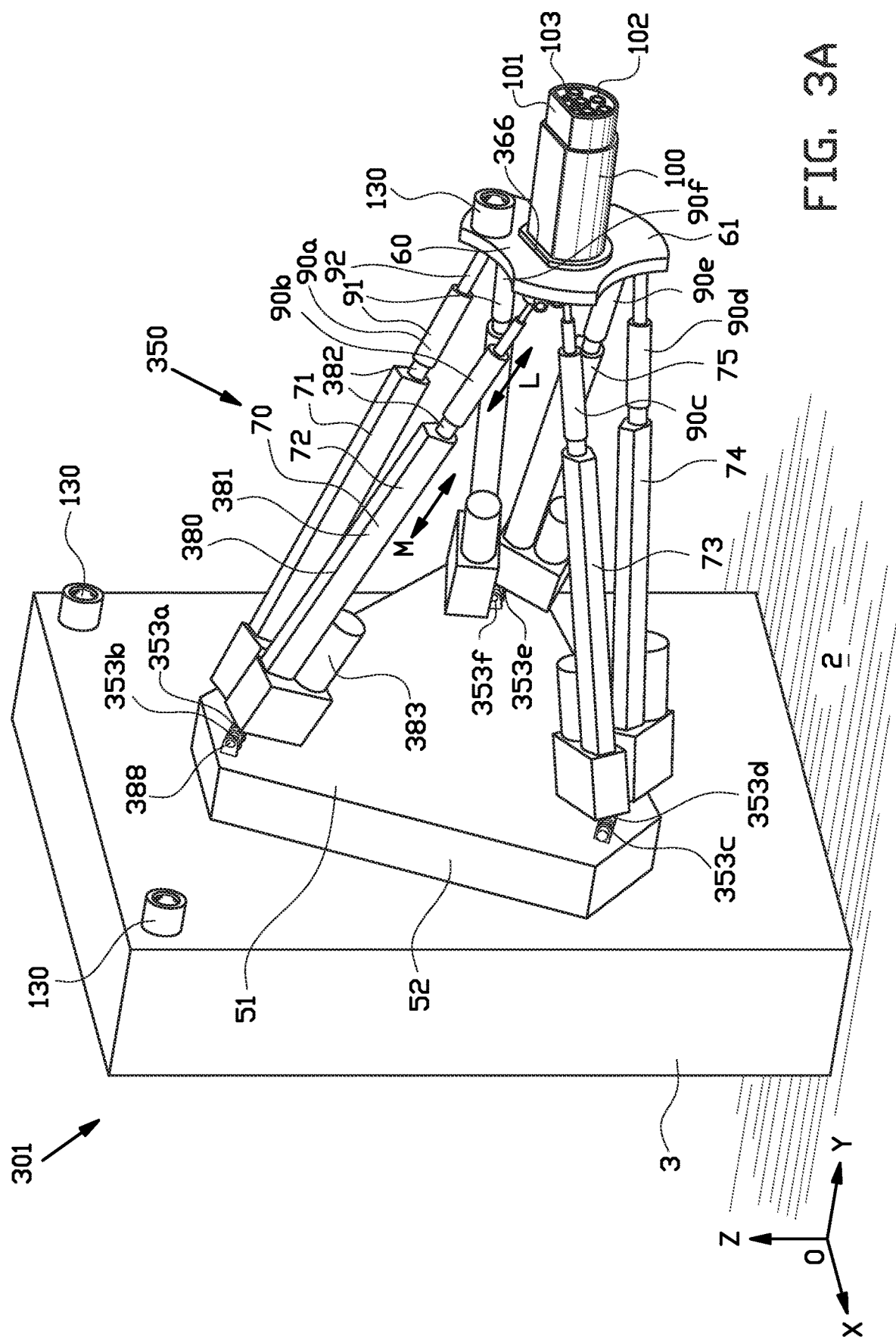
FIGS. 3A and 3B respectively are an isometric side view, and an isometric rear view of details of a charging station with a robot according to a third embodiment of the invention having the robot-side charging interface for establishing the charging connection with the vehicle-side charging interface of the electrically powered vehicle.
Figure 3B:
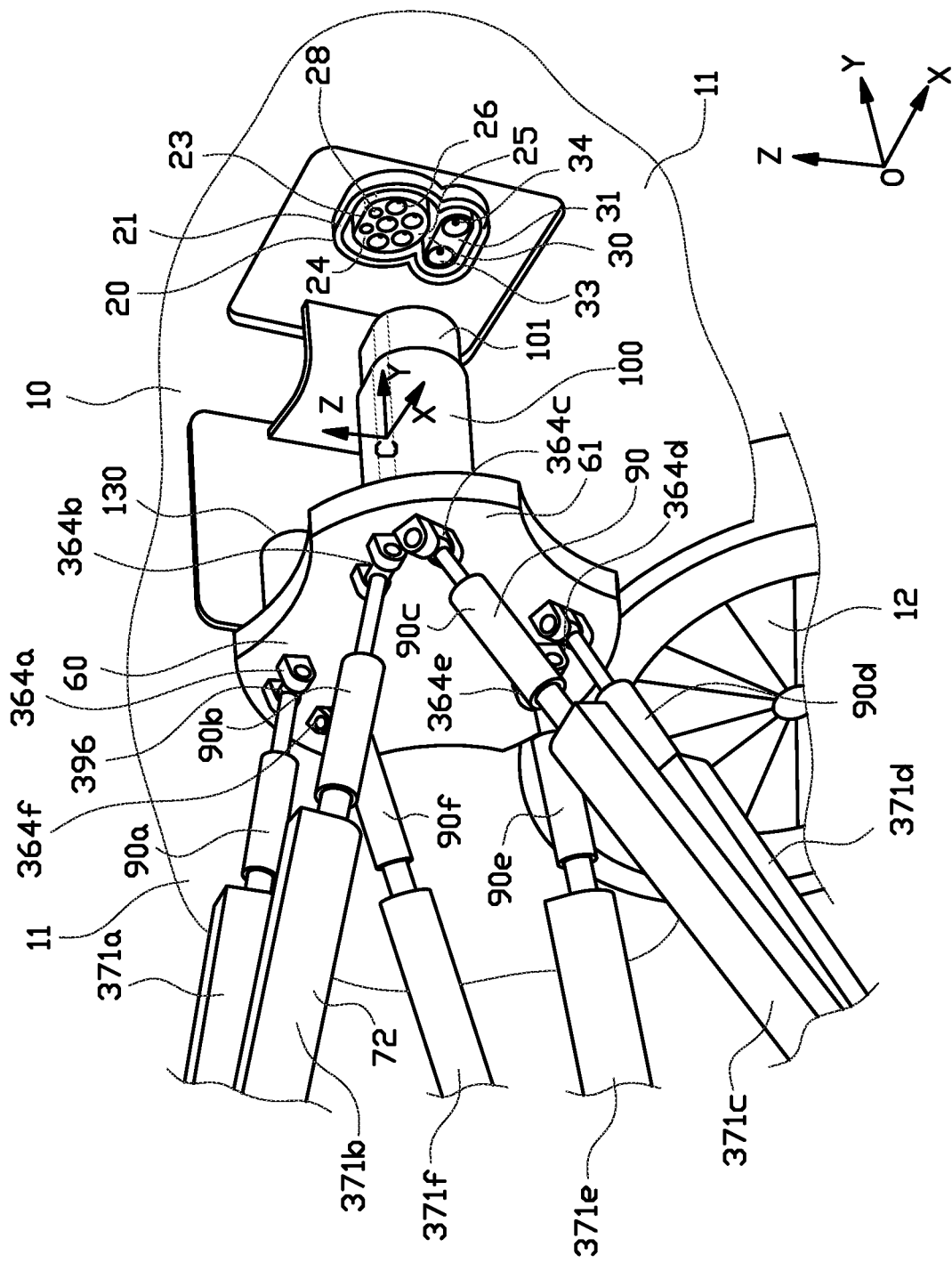

FIGS. 3A and 3B show a charging station 301 with a robot 350 according to a third embodiment of the invention. The parts that correspond with the first embodiment are provided with the same reference numbers. Only the deviating parts are discussed hereafter.

The robot 350 comprises the main base 51 that is in this example supported by a console 3 aside the vehicle area 2 at the side close to the vehicle-side charging interface 20. The main base 51 comprises the main frame 52 and in total six leg supports 353*a*-353*f* on the main frame 52 that are in a same plane and that form pairs in a triangular configuration. The robot 350 comprises the moveable carrier 60 having the carrier frame 61, and in total six leg supports 364*a*-364*f* on the carrier frame 61 that are in a same plane and that form pairs in a triangular configuration, wherein the distances between the pairs of leg supports 353*a*-353*f* are smaller than the distances between the pairs of leg supports 353*a*-353*f* of the main base 51. The carrier 60 carries the robot-side charging interface 100.

The robot 350 comprises in this example in total six parallel displacement assemblies between the main base 51 and the moveable carrier 60 that are embodied as six legs 371*a*-371*f* that extend between the leg supports 353*a*-353*f* of the main base 51 and the leg supports 364*a*-364*f* of the moveable carrier 60. The legs 371*a*-371*f* are identical in construction and are hereafter described in detail by referring to the first leg 371*a*.

The first leg 371*a* comprises a rectilinear motion actuator 380 having an outer tube 381 that is at its bottom end connected to its leg support 353*a* of the main base 51 via a first coupling 388 that is embodied as a universal rotation joint having two degrees of freedom. The rectilinear motion actuator 380 has in this example an electric motor 383 that is mounted to the outer tube 381. The rectilinear motion actuator 380 has a drive rod 382 that is rectilinearly guided inside the outer tube 81 and that partly projects from the outer tube 381. The drive rod 382 is operatively connected with the electric motor 383, for example via a spindle. As shown in FIG. 3A, the drive rod 382 is thereby reciprocally rectilinearly moveable in direction M with respect to the first coupling 388 over a displacement stroke by powering the electric motor 383 accordingly. The rectilinear motion actuator 380 has an internal sensor to measure the position of the drive rod 382 with respect to the outer tube 381, such as a revolution sensor or a revolution counter on the spindle. Thereby each leg 371*a*-371*f* has such sensor.

The legs 371a-371f each comprise the respective compliance assembly 90a-90f in series with the rectilinear motion actuator 380, wherein the outer tubes 91 are fixed to the drive rods 382, and the connecting rods 92 are with respective second couplings 396 that are embodied as universal rotation joints having three degrees of freedom that are connected with the leg supports 364a-364f on the carrier frame 61. The coil springs 95 of the compliance assemblies 90a-90f in the individual legs 371a-371f may have mutual different impedances, in this example different stiffness to ensure a default position of the robot-side charging interface 100 without hanging down due to for example an uneven weight distribution following from the different individual weights of the various components present in the robot 50.

The six legs 371a-371f form in this example a hexapod mechanism 70 between the main base 51 and the moveable carrier 60. Alternatively formulated the six legs 371a-371f form a Stewart-platform. The rectilinear motion actuators 80 impose displacements between the first couplings 388 and second couplings 389 which are followed by the moveable carrier 60 and thereby by the vehicle-side charging interface 100 as long as the threshold forces on the compliance assemblies 90 are not exceeded. The moveable carrier 60 can thereby make the translations in the three orthogonal directions X, Y, Z (lateral, longitudinal and vertical) and make rotations around these axes (pitch, roll, yaw), in total six degrees of freedom (6-DOF). A part of the imposed displacements between the first couplings 388 and the second couplings 389 can be reversibly absorbed by the compliance assemblies 90a-90f when the threshold force is exceeded.

Alternatively or in addition thereto, the moveable carrier 60 comprises a sensor 366 between the carrier frame 61 and the robot-side charging interface 100 as shown in FIG. 3A, such as a pressure sensor matrix, to obtain or derive abovementioned compliance data in the six degrees of freedom.

In abovementioned embodiments, the rotation actuators 53, 55, 57, 59 or motors 383 form a positioning implementation. The applied compliance assemblies 90a-90f form a compliance implementation in series therewith.

The charging stations 1, 201, 301 comprise an electronic control system for controlling the operation of the charging station 1. The electronic control system may comprise one or more imaging detectors 130, such as a video camera or multiple cameras to form a stereo camera, or distance sensors such as a LIDAR, radar or led based sensors to detect the position of the vehicle-side charging interface 20 of the vehicle in the charging station 1. The imaging detectors 130 form therefore part of a vision system. The imaging detectors 130 may be base-mounted, such as on the main base 51, or be carried by the robot 50, such as on the robot-side charging interface 100 as shown.

The control system comprises an electronic controller that is connected with the rotation actuators 53, 55, 57, 59 or the electric motors 383 to power and to control their rotations. The electronic controller is connected with the detectors 130, with the distance sensor(s) 110 via the first electric cable(s) 111, and with the end switch(es) 115 via the second electric cable(s) 116. The charging stations 1, 201, 301 may also comprise a redundant electronic control system that is connected with the end switch(es) 115, wherein abovementioned control system is the primary control system. The redundant control system may ultimately intervene onto, or overrule the main control system in specific extreme situations as detected by the end switch(es) 115. The control system may be connected with the battery charger to operate the charging via the bushes 102, 103 and to receive feedback therefrom that is indicative for the proper insertion of the robot-side charging interface 100 into the vehicle-side charging interface 20, for example by detecting the mating sequence of the contacting connectors inside the vehicle-side charging interface 20 and the robot-side charging interface 20. The electronic controller can communicate with the remotely controlled lock between the vehicle-side charging interface 100 and the robot-side charging interface 100 to determine the actual state of the lock or to lock a properly inserted robot-side charging interface 100 during the charging of the vehicle 10, or to detect a bad or incomplete insertion.

The electronic controller is configured to determine the spatial position and orientation of the vehicle-side charging interface 20 in the charging station 1. This can be performed by means of abovementioned vision system, or it can be derived from a database that comprises position data of the vehicle-side charging interfaces 100 of known vehicles, including the particular position data of the parked vehicle 10, or it can be derived from communication with the vehicle 10 or from an auxiliary control system. Mathematically a coordinate system S is defined that is coupled to the vehicle-side charging interface 20 to determine the position thereof in the three orthogonal directions X, Y, Z and any rotational orientation around these axes, wherein the Y-axis is preferably parallel to the receiving direction R.

The electronic controller is configured to determine a resultant force and resultant moment acting on the robot-side charging interface 100 from the compliance strokes in direction L of the applied individual compliance assemblies 90a-90f. Mathematically this is expressed by means of the following stiffness matrix and the coordinate system C:

$$\begin{vmatrix} F_x \\ F_y \\ F_z \\ M_x \\ M_y \\ M_z \end{vmatrix} = \begin{vmatrix} k_x & 0 & 0 & 0 & 0 & 0 \\ 0 & k_y & 0 & 0 & 0 & 0 \\ 0 & 0 & k_z & 0 & 0 & 0 \\ 0 & 0 & 0 & k_{rx} & 0 & 0 \\ 0 & 0 & 0 & 0 & k_{ry} & 0 \\ 0 & 0 & 0 & 0 & 0 & k_{rz} \end{vmatrix} \begin{vmatrix} \Delta x \\ \Delta y \\ \Delta z \\ \Delta \phi \\ \Delta \Theta \\ \Delta \psi \end{vmatrix}$$

In this matrix $F_x$, $F_y$, $F_z$ are the force components in Newton along the axes of the coordinate system, $M_x$, $M_y$, are the moments about the axes of the coordinate systems in Newtonmeter, $\Delta x$, $\Delta y$, $\Delta z$, are the displacement components in meter and $\Delta \phi$, $\Delta \Theta$, $\Delta \psi$ are the rotation components in radians, all expressed in the coordinate system C. The stiffness components $k_x$, $k_y$, $k_z$, $k_{rx}$, $k_{ry}$, $k_{rz}$ of the six degrees of freedom are related to the stiffness properties of the applied coil springs 95 in Newton per meter and in Newtonmeter per radian and depend on the specific configuration and current value of the compliance stroke. When in a particular configuration a compliance is constrained, whereby the applied compliance has less than the maximum of six degrees of freedom, a substantial higher stiffness component is applied.

The force components and moment components acting onto the robot-side charging interface 100 or imposed by the robot 50, 250, 350 onto the charging interface 100 are quantitatively related to the compliance strokes as defined in the displacement and rotation directions of coordinate system C. The following typical quantitative relations apply.

The below quantification defines for each direction in coordinate system C the likely range of stiffness and the likely range of compliance stroke in which the stiffness and compliance stroke of an embodiment according to the invention will lie. The compliance strokes are expressed in respectively meters or degrees. The stiffnesses are expressed in respectively kiloNewton per meter and kiloNewtonmeter per radian.

| Direction | Stiffness | Stroke |
|---|---|---|
| X | [0.25, 40] | [0.005, 0.1] |
| Y | [0.25, 40] | [0.005, 0.1] |
| Z | [0.25, 40] | [0.005, 0.1] |
| RX | [0.005, 6] | [0.5, 15] |
| RY | [0.005, 6] | [0.5, 15] |
| RZ | [0.005, 6] | [0.5, 15] |

The below quantification defines for each direction in coordinate system C the maximum range of stiffness and the maximum range of compliance stroke in which the stiffness and compliance stroke of an embodiment according to the invention will lie. The compliance strokes are expressed in respectively meters or degrees. The stiffnesses are expressed in respectively kiloNewton per meter and kiloNewtonmeter per radian.

| Direction | Stiffness | Stroke |
|---|---|---|
| X | [0.1, 200] | [0.002, 0.25] |
| Y | [0.1, 200] | [0.002, 0.25] |
| Z | [0.1, 200] | [0.002, 0.25] |
| RX | [0.001, 24] | [0.25, 30] |
| RY | [0.001, 24] | [0.25, 30] |
| RZ | [0.001, 24] | [0.25, 30] |

The electronic controller is configured to determine the position and orientation of the robot-side charging interface 100 in the coordinate system O from feedback of the rotation actuators 53, 55, 57, 59 or motors 383, the compliance assemblies 90a-90f and by using the vision system.

The charging station 1 forms part of a charging infrastructure having a remote computer server for communication with and for configuration of the electronic controller. The electronic control system is loaded with software that is executed by a processor of the electronic controller, whereby the charging station 1 performs the following operation as explained hereafter.

Figure 6A:
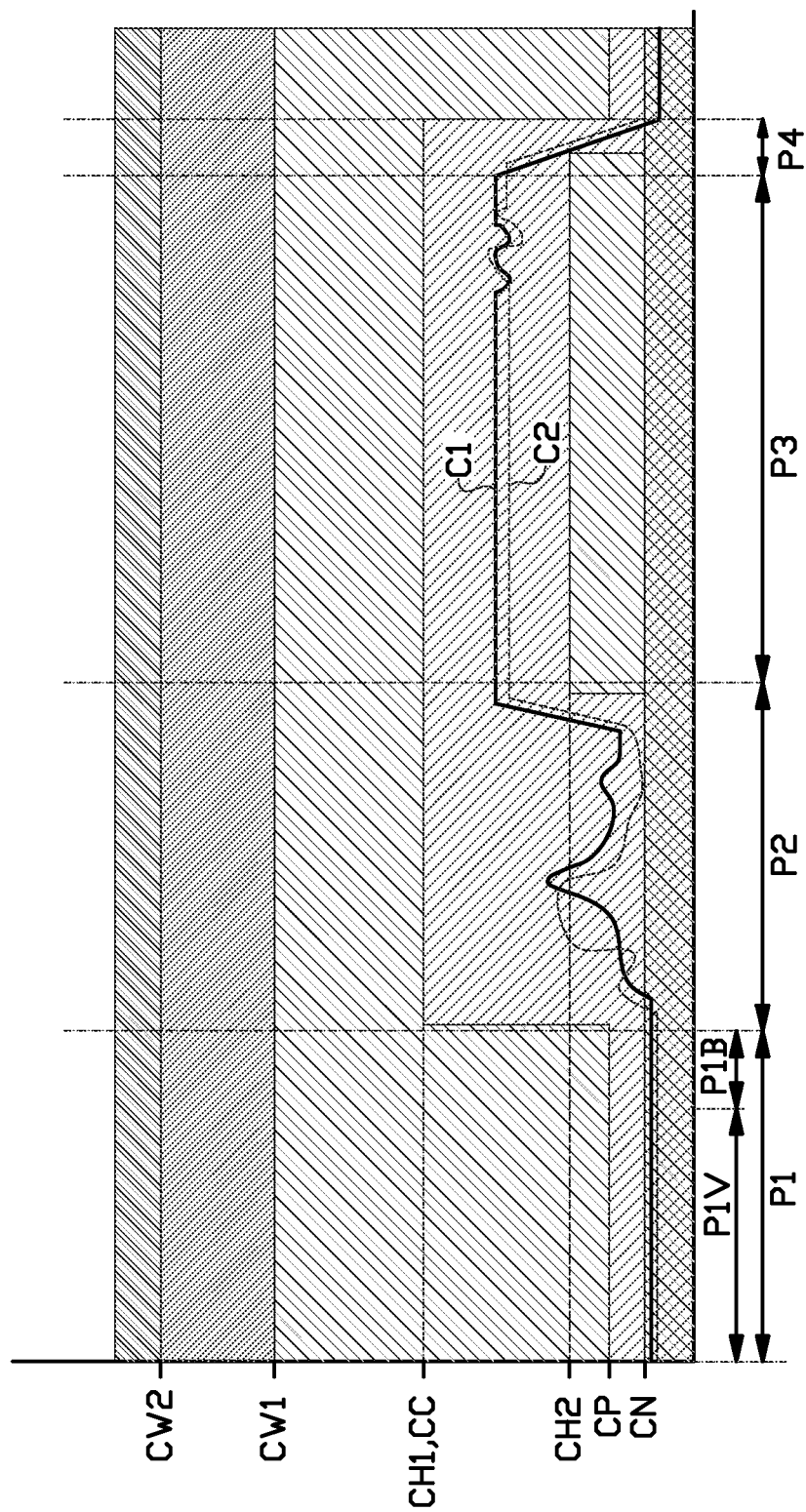

The explanation of the operation of the charging stations 1, 201, 301 starts with the robots 50, 250, 350 in a fully retracted position whereby the robot-side charging interface 100 is withdrawn from the vehicle area 2 in a standby position to allow the vehicle 10 to enter the charging station 1, 201, 301. As schematically indicated in FIG. 1A, the robot-side charging interface 100 is in this fully retracted position at a schematically indicated distance Q from the vehicle 10, in particular from the vehicle-side charging interface 20 that will be parked at the vehicle area 2. Hereafter the operation is explained under reference to the charging station 1 according to the first embodiment, wherein the differences with the charging stations 201, 301 according to the second and third embodiment are explained when applicable. FIG. 6A is a diagram that illustrates along the vertical axis the first compliance value C1, for example, in millimeters as provided by the sole first compliance assembly 90a of the charging station 1 according to the first embodiment, or as provided by the multiple compliance assemblies 90a-90f according to the second and third embodiments, wherein for illustrative purposes the first compliance C1 and the second compliance C2 of only the first compliance assembly 90a and the second compliance assembly 90b are plotted. The horizontal axis indicates the lapsed time in seconds.

In the diagram of FIG. 6A specific reference values for the compliances are plotted. In the diagram the noise threshold value CN indicates a maximum value for the first compliance C1 and the second compliance C2 to be neglected because it does not affect a proper functioning of the robots 50, 250, 350. These small values for the compliances C1, C2 may be typically caused by vibrations in the drive chain of the robot 50, 250, 350 that act via one or more of the compliance assemblies 90a-90f onto the robot-side vehicle interface 100. The other values CP, CC, CH1, CH2 indicate maximum or minimum values that trigger specific interventions when exceeded as explained hereafter.

Figure 7:
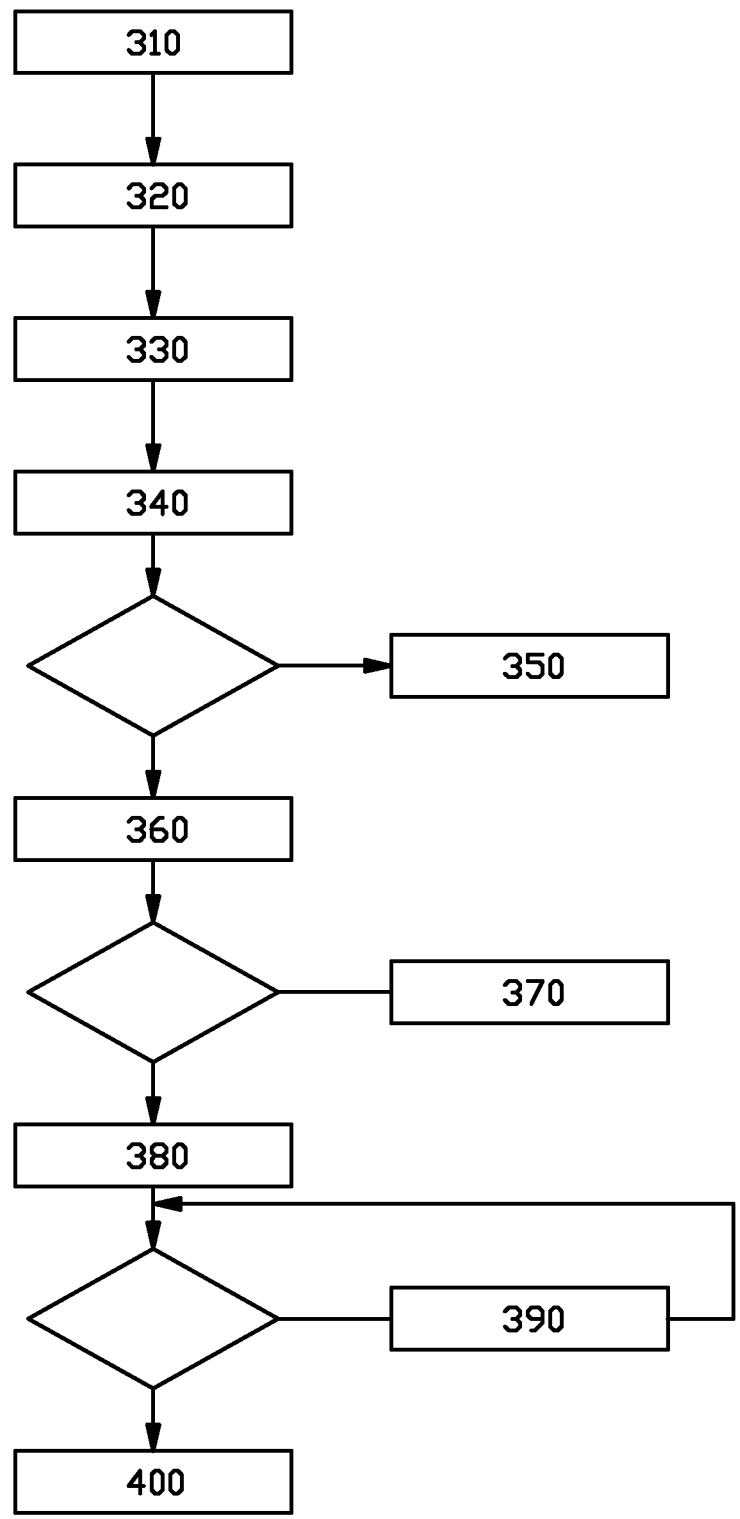
FIG. 7 is a flow chart of the steps that are performed during the operation of the robot according to the previous figures.

Hereafter, firstly the ideal charging cycle is described under reference to FIGS. 6A and 7, that is not disturbed by external influences or by blockades between the engaging charging interfaces 20, 100.

In a first step 310 the presence of a particular vehicle 10 at the vehicle area 2 is notified by means of the imaging detectors 130, or by any other appropriate sensor, or by any type of data communication between the vehicle 10 and the charging station 1, or by any type of remote trigger system, or by registration by the driver of the vehicle 10, or by a human operator on site at the charging station 1.

When the presence or upcoming presence of the vehicle 10 is notified, then in a second step 320 the spatial position and orientation of the vehicle-side charging interface 20 in the charging station 1 are determined by means of the imaging sensors 130, or from the database that comprises the position data of the vehicle-side charging interfaces 20 of known vehicles 20, or derived from communication with the vehicle 20 or obtained from the auxiliary control system. This comprises the position in the three orthogonal directions X, Y, Z and any rotational orientation around these axes.

In a third step 330, the corresponding particular initial connecting position of the robot-side charging interface 100 with respect to the vehicle-side charging interface 20 is determined. The initial connecting position is defined as the position in which the robot-side charging interface 100 is in front of, but not yet in contact with the vehicle-side charging interface 20. The initial connecting position is determined by determining the position of the vehicle-side charging interface 20, followed by subtracting and/or adding the maximum cumulative system inaccuracies, such as sensor and actuator inaccuracies, from and/or to the determined spatial position and orientation of the vehicle-side charging interface 20. Mathematically in this position the Euclidian distance T between any physical part of the robot-side charging interface 100 and the vehicle-side charging interface 20 is maximum 10 millimeters, and preferably maximum 5 millimeters. In the initial connection position the robot-side charging interface 100 is aligned with the vehicle-side charging interface 20 with a misalignment distance transverse to the receiving direction R of maximum 5 millimeters, preferably maximum 3 millimeters. In the initial connection position the robot-side charging interface 100 is aligned with the vehicle-side charging interface 20 under a deviation angle of maximum 3-5 degrees, preferably 2 degrees, more preferably maximum 1 degree. These deviations may be larger than allowed by the self-searching shape features of the charging interfaces 20, 100, as these may be corrected under the applied compliance as described hereafter. In the initial connecting position it is practically impossible to encounter a physical blockade in between such as a human hand.

In a fourth step 340, the rotation actuators 53, 55, 57, 59, or motors 383 are individually powered while their rotational position is controlled to bring the robot-side charging interface 100 into the determined initial connecting position, while the maximum cumulative system inaccuracies of the position determination inside the drive chain are taken into account.

The second step 320, the third step 330 and the fourth step 340 form part of a positioning phase P1 in which these steps may be iterated to bring the charging interface 100 in the initial connecting position. In this positioning phase P1 the robot-side charging interface 100 makes a relatively large travelling stroke towards the vehicle 10 ideally without any compliance stroke of the compliance assembly 90a with a value above the noise threshold CN. The positioning phase P1 may consist of an imaging supported positioning phase P1V and a subsequent blind positioning phase P1B. In the imaging supported positioning phase P1V the robot-side charging interface 100 is moved from the fully retracted position to a position in which the imaging detectors 130 cannot clearly determine the position of the vehicle-side charging interface 20 anymore due to the presence of the approaching parts of the robot 50, 250, 350.

Figure 5B:
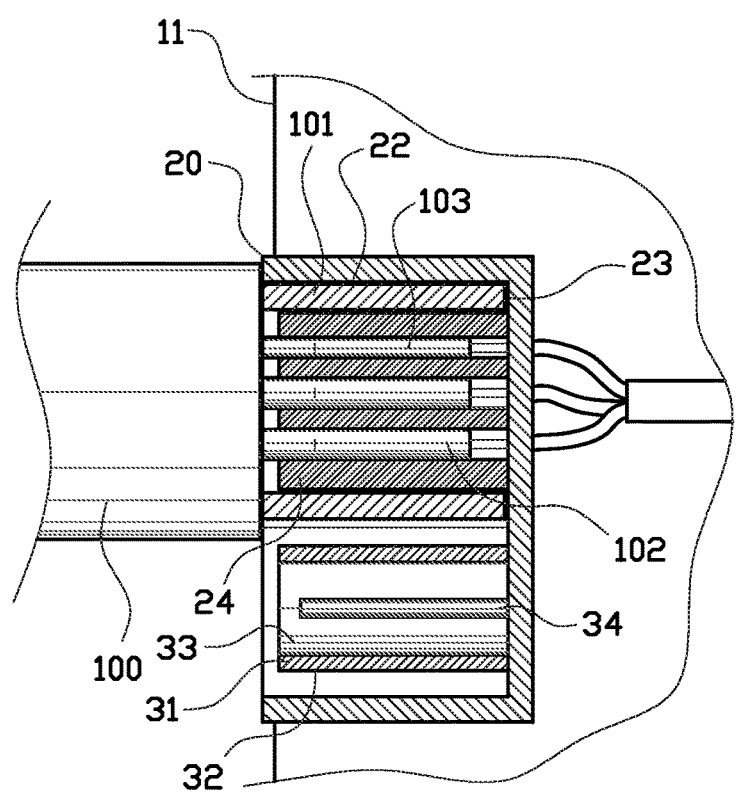
FIG. 5B is a partial longitudinal section of the robot-side charging interface and the vehicle-side charging interface as shown in FIG. 5A that have properly established the charging connection.

In a sixth step 360 the rotation actuators 53, 55, 57, 59, or motors 383 are individually powered while their rotational position is controlled to bring the robot-side charging interface 100 from the initial connecting position as shown in FIG. 5A into the proper final engagement position of the robot-side charging interface 100 with respect to the vehicle-side charging interface 20 as shown in FIG. 5B. After proper engagement of the charging interfaces 20, 100, the remotely controlled locked is activated to lock the engagement. The sixth step 360 forms part of a connecting phase P2. Mathematically the coordinate system C of the robot-side charging interface 100 is collocated with coordinate system S of the vehicle-side charging interface 20.

Figure 5C:
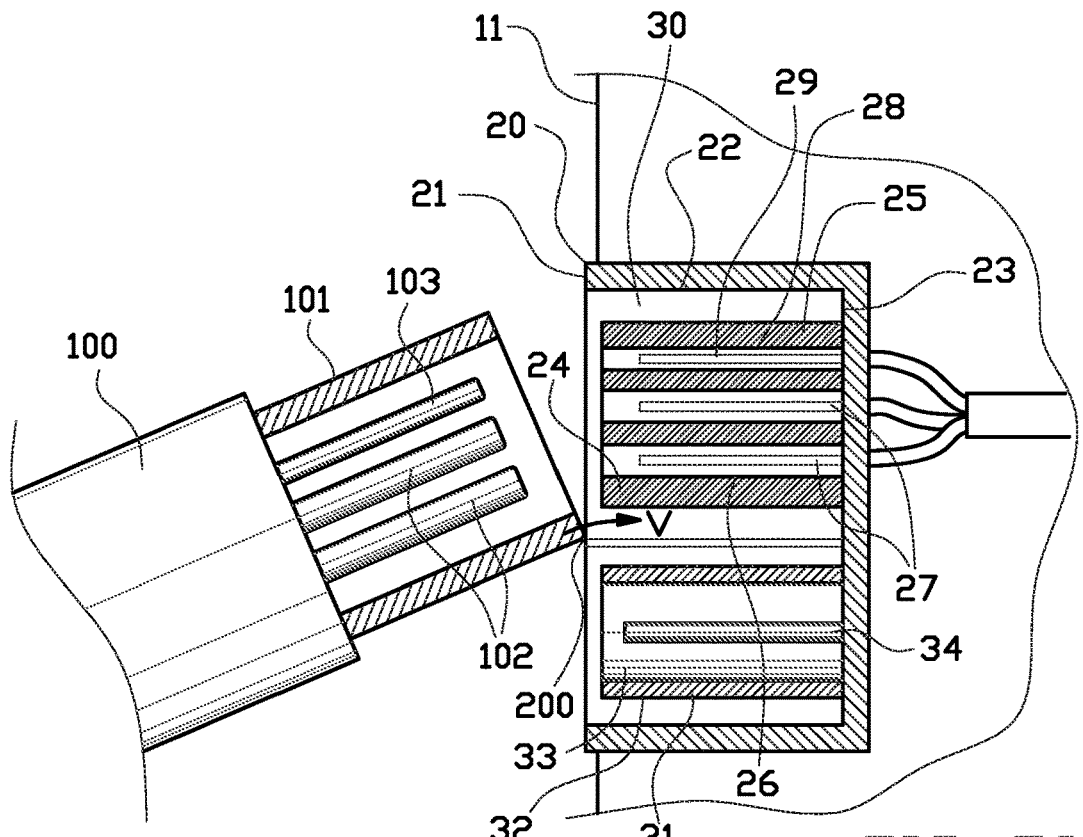
FIGS. 5C and 5D are partial longitudinal sections of the robot-side charging interface and the vehicle-side charging interface as shown in FIG. 5A during correction of an allowable misalignment under control of the robot.
Figure 5D:
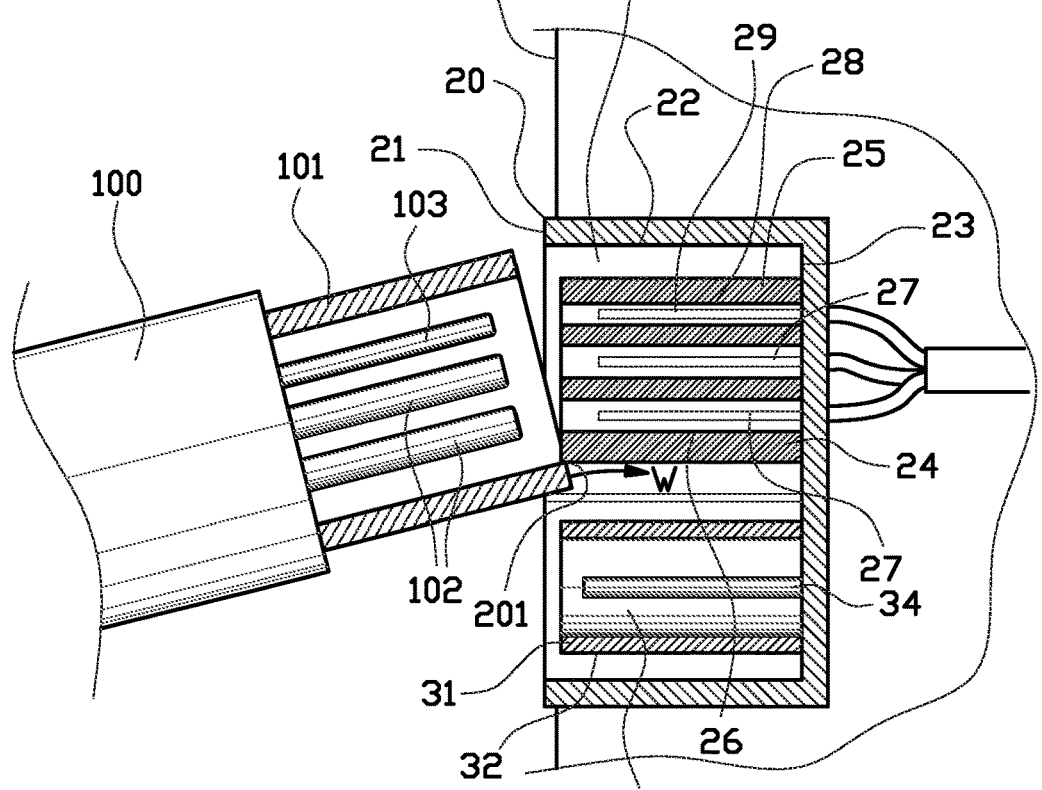

During the connecting phase P2 some compliance is expected as a compression force is required to overcome friction and to correctly bring the robot-side charging interface 100 into the mating vehicle side-charging interface 20. During the connecting phase P2 some differences between the values of the first compliance CW1 and the second compliance CW2 may occur, from which correctable misalignments are derived and the correction thereof is induced or detected, as is determined by a connecting instruction. For example the first physical contact 200 as shown in FIG. 5C may force the robot-side charging interface 100 to tilt or slide with respect to the vehicle-side charging interface 20 while a pushing force is transferred from the main base 51 via the biased coil springs 95. The coil springs 95 may compressed when their defined threshold force is exceeded, which is monitored by means of the sensors 66, 96, 110. The compliance as provided by the individual coil springs 95 may induce a sliding movement of the robot-side charging interface 100 in direction V along the vehicle-side charging interface 20 by their self-searching shape features, and/or a corrective activation of the electric motors 83 is determined based on the signals of the sensors 66, 96, 110. In FIG. 5C the illustrated misalignment contains a translation and a rotation in the same plane. It will be clear that any misalignment in all six degrees of freedom can occur, can be detected and corrected by corresponding corrective actions of the rotation actuators 53, 54, 56, 59, 383. This is repeated until the proper final engagement position of the robot-side charging interface 100 with respect to the vehicle-side charging interface 20 is reached. In this iteration a further physical contact 201 as shown in FIG. 5D may be detected and corrected by inducing a sliding movement in direction W. Due to this iteration it is possible to compensate deviations that are larger than allowed by the self-searching shape features of the charging interfaces 20, 100. The stroke of the robot 50 ends such that the first compliance C1 and the second compliance C2 have a value that corresponds with about half of the maximum length of the compliance stroke, whereby in the robots 50, 250 according to the first and second embodiments the robot-side charging interface 100 can resiliently move both towards and away from the moveable carrier 60, and in the robot 350 according to the third embodiment the moveable carrier 60 can follow the movements of the vehicle-side charging interface 20.

In an eighth step 380 the charging is activated. The eighth step 380 forms part of a charging phase P3. During the charging phase P3 some changes in the value of the compliance may occur because the vehicle 10 slightly moves with respect to the robot 50. The slight movement of the vehicle 10 may be caused by a passenger that steps in or out, or by wind acting on the vehicle 10.

In an tenth step 400 the remotely controlled locked is released to unlock the engagement of the charging interfaces 20, 100. The robot-side charging interface 100 is retracted by corresponding actuation of the rotation actuators 53, 54, 56, 59 or motors 383 and disconnected from the vehicle side charging interface 20. The tenth step 400 forms part of an disconnecting phase P4.

During the charging phase P3 the first compliance C1 and the second compliance C2 are continuously measured by means of the distance sensor (s) 110 and monitored. During the charging phase P3 any compliance with a value below the noise threshold CN is neglected.

In the above described ideal charging cycle, the first compliance C1 and the second compliance C2 both have a value that during the positioning phase P1 remains below a positioning intervention value CP. During the connecting phase P2 the first compliance C1 and the second compliance C2 both have a value that remains below the higher connecting intervention value CC. During the charging phase P3 the first compliance C1 and the second compliance C2 have a value that remains balanced within a first charging intervention value CH1, for example equal to the connecting intervention value CC, and a second charging intervention value CH2, for example higher than the positioning intervention value CP and lower than the connecting intervention value CC.

Hereafter some deviation scenarios are discussed under reference to FIGS. 6A-6E in which the electronic control system induces specific interventions to provide a safe operation of the charging station 1.

Figure 6B:
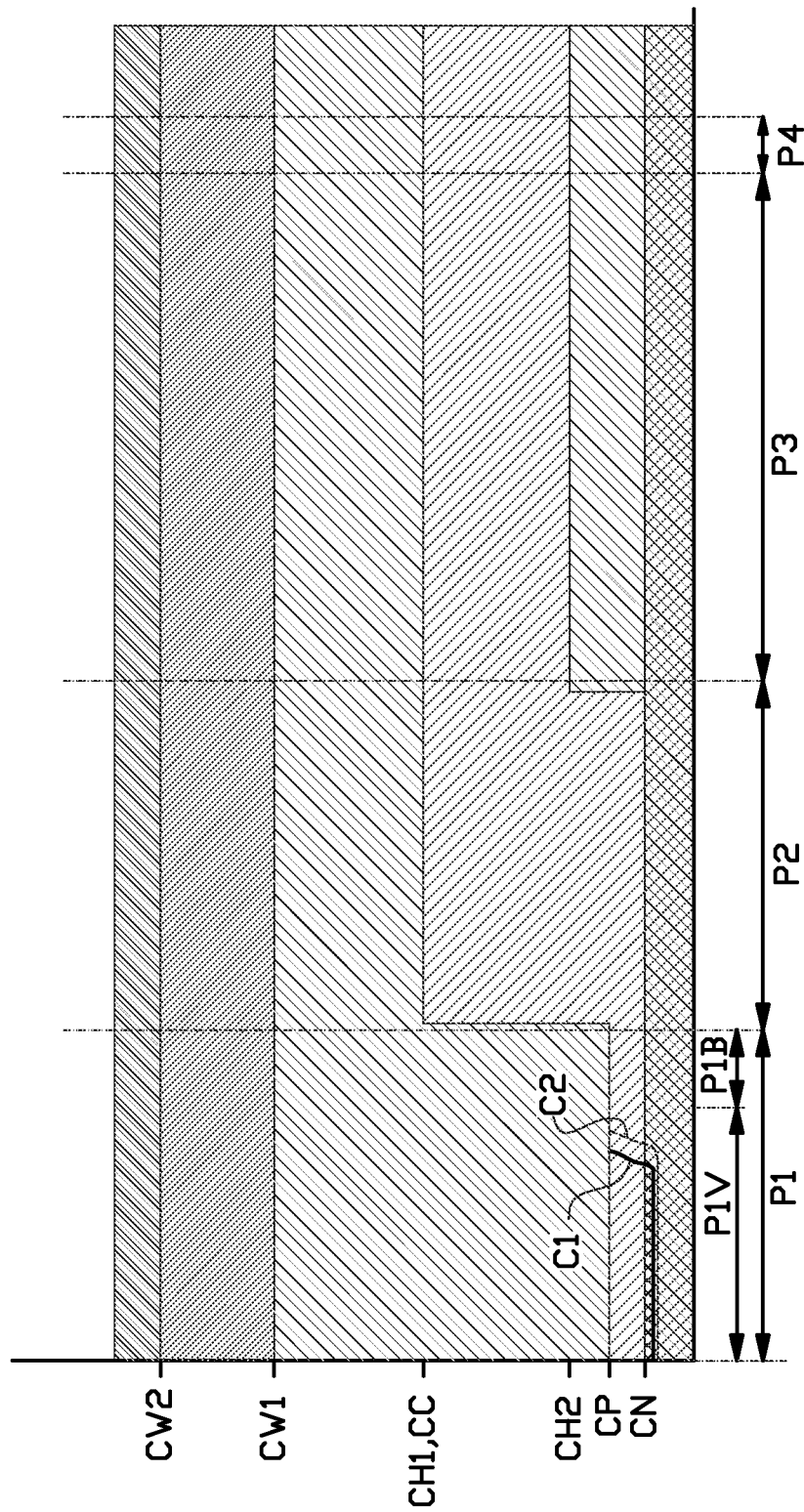

FIG. 6B shows a scenario in which during the positioning phase P1 the first compliance C1 or the second compliance C2 has a value that exceeds the positioning intervention value CP. It is then concluded that a collision with an unexpected physical object has occurred, for example with a person that stands between the robot 50, 250, 350 and the vehicle 10. Then in a fifth step 350 the rotation actuators 53, 54, 56, 59 or motors 383 are stopped or actuated to retract the robot-side charging interface 100 into its fully retracted position.

Figure 6C:
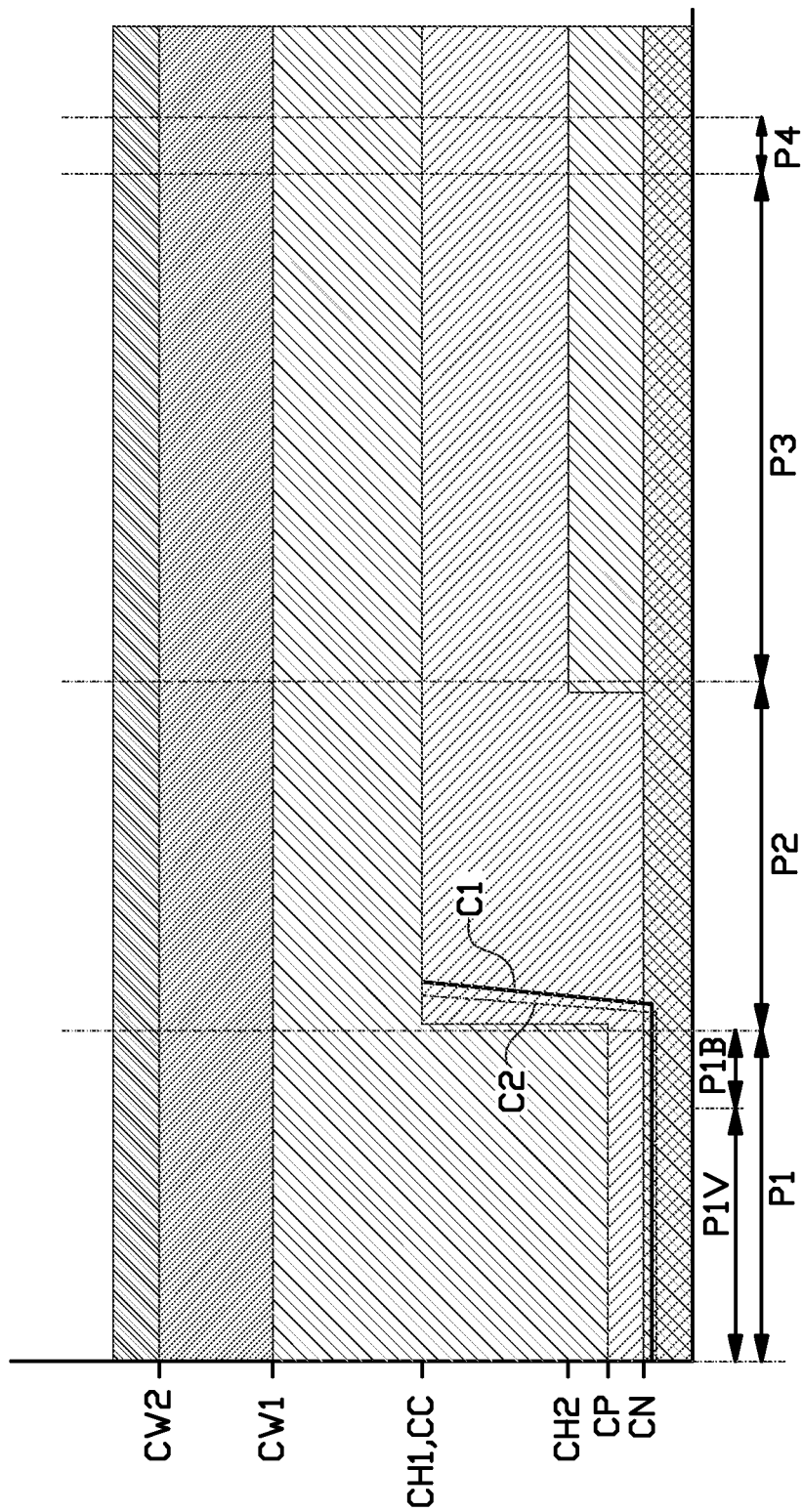

FIG. 6C shows a scenario in which at the beginning of the connecting phase P2 the first compliance C1 or second compliance C2 has a value that exceeds the connecting intervention value CC. It is then concluded that the robot-side charging interface 100 is unexpectedly misaligned with the vehicle-side charging interface 20 to such extend that it cannot properly connect anymore. The applied compression forces exceed the allowed insert force. This can for example be caused by an unexpected movement of the vehicle 10 during the connecting phase P2. Then in a seventh step 370 the rotation actuators 53, 54, 56, 59 or motors 383 are actuated to retract the robot-side charging interface 100 towards its fully retracted position or into the initial connecting position.

Figure 6D:
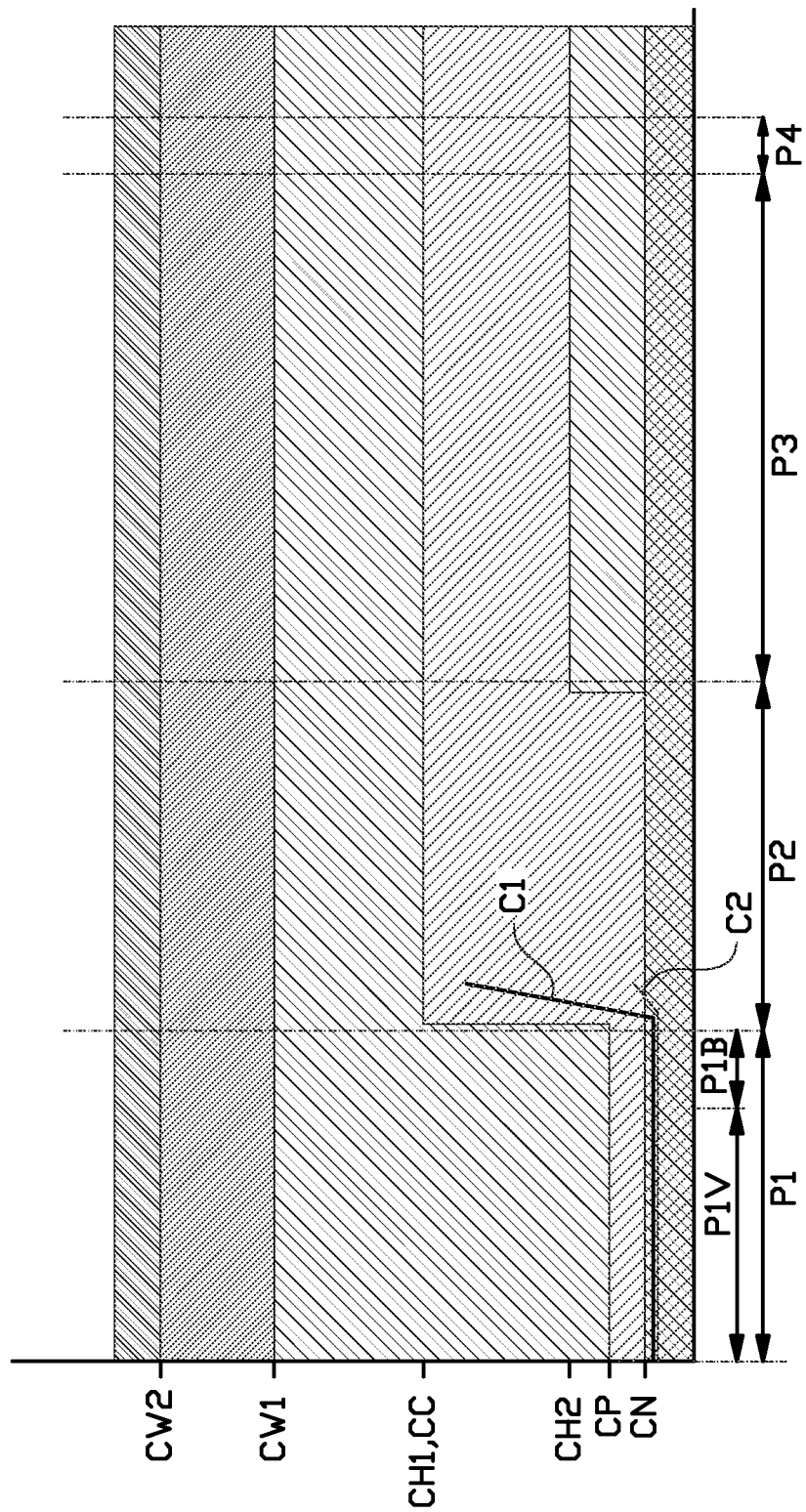

FIG. 6D shows a scenario in which at the beginning of the connecting phase P2 large mutual differences are present between the first compliance C1 and the second compliance C2. It is then concluded that the robot-side charging interface 100 has unexpectedly rotated with respect to the vehicle-side charging interface 20. This can for example be caused by an unexpected movement of the vehicle 10 during the connecting phase P2. Then in a seventh step 370 the rotation actuators 53, 55, 57, 59 or motors 383 are actuated to retract the robot-side charging interface 100 towards its fully retracted position or into the initial connecting position.

FIG. 6E shows a scenario in which during the connecting phase P2 the first compliance C1 or the second compliance C2 has a value that exceeds the connecting intervention value CC. This can for example be caused by a connector blockage during insertion of the robot-side charging interface 100 into the vehicle-side 20. Then in a seventh step 370 the rotation actuators 53, 55, 57, 59 or motors 383 are actuated to retract the robot-side charging interface 100 towards its fully retracted position or into the initial connecting position.

Figure 6F:
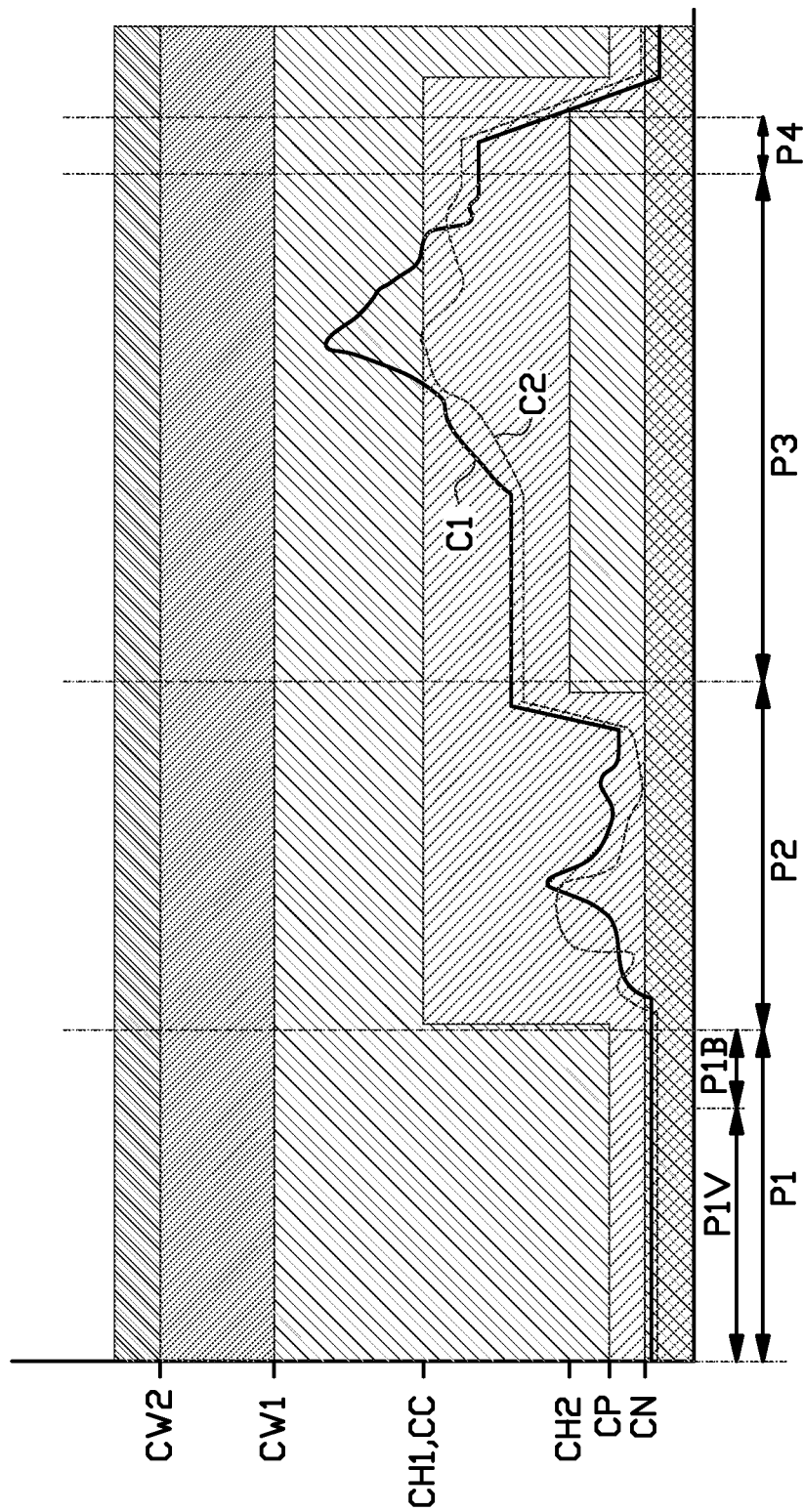

FIG. 6F shows a scenario in which during the charging phase P3 the first compliance C1 or the second compliance C2 has a value that exceeds the first charging intervention value CC1 or comes below the second charging intervention value CC2. This can be caused by heavy movement of the vehicle 10, for example due to a number of passengers stepping into the vehicle 10 that pushes the vehicle-side charging interface 20 to such extend towards the moveable platform 60 that the limits for safe absorption thereof by the compliance assemblies 90a-90f are reached. Then in a ninth step 390 the rotation actuators 53, 55, 57, 59 of the robots 50, 250 according to the first or second embodiment are actuated to reposition the moveable platform 60 with respect to the vehicle 10 whereby the first compliance C1 and the second compliance C2 have a value that is balanced again between the first charging intervention value CC1 and the second charging intervention value CC2, or the motors 383 of the robot 350 according to the third embodiment are actuated to rebalance the compliance assemblies 90a-90f with the same effect.

In all scenarios the values of the first compliance C1 and the second compliance C2 are monitored by means of the distance sensor 110 for exceeding the first warning intervention value CW1. The first warning intervention value CW1 is higher than the positioning intervention value CP, the connecting intervention value CC and the first charging intervention value CC1. When the first compliance C1 or the second compliance C2 has a value that exceeds the first intervention value CW1, the rotation actuators 53, 54, 56, 59 or motors 383 are immediately stopped when active during the positioning phase P1 or the connecting phase P2, and during the charging phase P3 the charging current is interrupted. When the first compliance C1 or the second compliance C2 has a value that exceeds the first intervention value CW1, an audio alarm or visual alarm is triggered.

In all scenarios the values of the first compliance C1 and the second compliance C2 are monitored by means of the end switch 115 for exceeding the second warning intervention value CW2. The second warning intervention value CW2 is higher than the first warning intervention value CW1. When the first compliance C1 or the second compliance C2 has a value that exceeds the second warning intervention value CW2, the rotation actuators 53, 54, 56, 59 or motors 383 are immediately stopped when active during the positioning phase P1 or the connecting phase P2, and during the charging phase P3 the charging current is interrupted. When the first compliance C1 or the second compliance C2 has a value that exceeds the second warning intervention value CW2, an audio alarm or visual alarm is triggered. When the first compliance C1 or the second compliance C2 has a value that exceeds the second warning intervention value CW2, the remote controlled lock that locks the robot-side charging interface 100 and the vehicle-side charging interface 20 is released to allow the charging interfaces 20, 100 to passively disengage from each other or to be actively disengaged by powering the rotation actuators 53, 54, 56, 59 or motors 383 accordingly.

In practice, the first positioning intervention value is 50% or less, preferably 25% or less of the first connecting intervention value. In the described embodiments, the first charging intervention value CH1 is equal to the charging intervention value CC.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. Method for controlling a charging infrastructure comprising a charging station for charging a vehicle having a vehicle-side charging interface, wherein the charging station comprises a robot that carries a robot-side charging interface for establishing a charging connection with the vehicle-side charging interface, wherein the robot comprises a main base, a displacement mechanism between the main base and the robot-side charging interface for moving the robot-side charging interface with at least three degrees of freedom with respect to the main base, wherein the displacement mechanism comprises at least one actuator that is configured for imposing a displacement between the main base and the robot-side charging interface over a displacement stroke when the actuator is actuated, wherein the robot comprises a compliance assembly that is arranged kinematically in series with an actuator between the main base and the robot-side charging interface, wherein the compliance assembly is configured for providing a compliance by resiliently absorbing or releasing a displacement between the base frame and the robot-side charging interface over a compliance stroke, wherein the method comprises in series a positioning phase in which the robot-side charging interface is moved from a retracted position in which the vehicle can enter or exit the charging station, to an initial connecting position in which the robot-side charging interface is in front of the vehicle-side charging interface, a connecting phase in which the robot-side charging interface establishes a charging connection with the vehicle-side charging interface from the initial connecting position, a charging phase in which the vehicle is charged by a charging current through the robot-side charging interface, and a disconnecting phase in which the robot-side charging interface disengages from the vehicle-side charging interface and is retracted towards the retracted position, wherein in the positioning phase the actuator is powered according to a positioning instruction, the compliance is monitored, a compliance value is compared with a positioning intervention value and the positioning instruction is changed when the compliance value exceeds the positioning intervention value, and wherein in the connecting phase the actuator is powered according to a connecting instruction, the compliance is monitored, the compliance value is compared with a connecting intervention value and the connecting instruction is changed when the compliance value exceeds the connecting intervention value, wherein the positioning intervention value differs from the connecting intervention value wherein the positioning intervention value is smaller than the connecting intervention value.

2. Method according to claim 1, wherein the positioning intervention value is smaller than 50% of the connecting intervention value.

3. Method according to claim 1, wherein the positioning intervention value is smaller than 25% of the connecting intervention value.

4. Method according to claim 1, wherein the positioning instruction is changed to stop the actuation of the actuator when the compliance value exceeds the positioning intervention value.

5. Method according to claim 1, wherein the positioning instruction is aborted when the compliance value exceeds the positioning intervention value and the actuator is powered according to a retraction instruction to retract the robot-side charging interface towards the retracted position.

6. Method according to claim 1, wherein the connecting instruction is changed to stop the actuation of the actuator when the compliance value exceeds the connecting intervention value.

7. Method according to claim 1, wherein the connecting instruction is aborted when the compliance value exceeds the connecting intervention value and the actuator is powered according to a retraction instruction to retract the robot-side charging interface towards the retracted position or to the initial connecting position.

8. Method according to claim 1, wherein in the charging phase the actuator is powered according to a charging instruction and the compliance is monitored, wherein the charging instruction defines that the compliance value is brought between a first charging intervention value and a lower second charging intervention value.

9. Method according to claim 8, wherein in the charging phase the actuator is powered according to the charging instruction at the beginning of the charging phase, and the actuator is idling, when the compliance value is between the first charging intervention value and the lower second charging intervention value.

10. Method according to claim 8, wherein according to the charging instruction the actuator is powered to bring the compliance value between the first charging intervention value and the second charging intervention value when the compliance value exceeds the first charging intervention value or comes below the second charging intervention value.

11. Method according to claim 8, wherein in the positioning phase, in the connecting phase and in the charging phase the actuator is powered according to an intervention instruction and the compliance value is monitored, wherein the compliance value is compared with a warning intervention value, wherein, when the warning intervention value is exceeded, an intervention instruction is started that is selected from the group comprising:
 interruption of a charging current through the robot-side charging interface;
 triggering an audio alarm; —triggering a visual alarm; communicating an alarm state to the vehicle or to a higher level management system;
 triggering a mechanical breakout release; and
 retraction of the robot-side charging interface from the vehicle-side charging interface.

12. Method according to claim 11, wherein
 in the positioning phase, the warning intervention value is higher than the positioning intervention value;
 in the connecting phase, the warning intervention value is higher than the connecting intervention value; and/or
 in the charging phase, the warning intervention value is higher than the first charging intervention value or lower than second charging intervention value, or the warning intervention value has a first warning intervention value higher than the first charging intervention value, and a second warning intervention value lower than the second charging intervention value.

13. Method according to claim 11, wherein the positioning phase comprises the steps of determining the position of the vehicle-side charging interface and determining the initial connecting position by adding the cumulative system inaccuracies to or subtracting it from the determined position of the vehicle-side charging interface.

14. Charging infrastructure comprising a charging station for charging a vehicle having a vehicle-side charging interface, wherein the charging station comprises a robot that carries a robot-side charging interface for establishing a charging connection with the vehicle-side charging interface, wherein the robot comprises a main base, a displacement mechanism between the main base and the robot-side charging interface for moving the robot-side charging interface with at least three degrees of freedom with respect to the main base, wherein the displacement mechanism comprises at least one actuator that is configured for imposing a displacement between the main base and the robot-side charging interface over a displacement stroke when the actuator is actuated, wherein the robot comprises a compliance assembly that is arranged kinematically in series with an actuator between the main base and the robot-side charging interface, wherein the compliance assembly is configured for providing a compliance by resiliently absorbing or releasing a displacement between the base frame and the robot-side charging interface over a compliance stroke, wherein the charging infrastructure further comprises a controller operatively connected to at least the robot, wherein the charging infrastructure is adapted to carry out a method in accordance with claim 1.

15. Charging infrastructure according to claim 14, wherein the controller is an electronic controller, configured to determine a resultant force and/or resultant moment acting on the robot-side charging interface from the compliance strokes.

16. Charging infrastructure according to claim 14 comprising a sensor between the robot and the charging interface to obtain or derive compliance data in six degrees of freedom.

17. Charging infrastructure according to claim 16, wherein the sensor is a distance sensor on the compliance stroke, a force or pressure sensor.

18. Charging infrastructure according claim 14, comprising a switch positioned and configured to detect an abutment of an end stop, and/or positioned and configured to serve as part of a redundant control system to ultimately intervene onto or overrule the main control system in specific extreme situations.

19. Method for controlling a charging infrastructure comprising a charging station for charging a vehicle having a vehicle-side charging interface, wherein the charging station comprises a robot that carries a robot-side charging interface for establishing a charging connection with the vehicle-side charging interface, wherein the robot comprises a main base, a displacement mechanism between the main base and the robot-side charging interface for moving the robot-side charging interface with at least three degrees of freedom with respect to the main base, wherein the displacement mechanism comprises at least one actuator that is configured for imposing a displacement between the main base and the robot-side charging interface over a displacement stroke when the actuator is actuated, wherein the robot comprises a compliance assembly that is arranged kinematically in series with an actuator between the main base and the robot-side charging interface, wherein the compliance assembly is configured for providing a compliance by resiliently absorbing or releasing a displacement between the base frame and the robot-side charging interface over a compliance stroke, wherein the method comprises in series a positioning phase in which the robot-side charging interface is moved from a retracted position in which the vehicle can enter or exit the charging station, to an initial connecting position in which the robot-side charging interface is in front of and aligned with the vehicle-side charging interface, a connecting phase in which the robot-side charging interface establishes a charging connection with the vehicle-side charging interface from the initial connection position, a charging phase in which the vehicle is charged by a charging current through the robot-side charging interface, and a disconnecting phase in which the robot-side charging interface disengages from the vehicle-side charging interface and is retracted towards the retracted position, wherein in the charging phase the actuator is powered according to a charging instruction and the compliance is monitored, wherein the charging instruction defines that the compliance value is brought between a first charging intervention value and a lower second charging intervention value, and wherein in the positioning phase, in the connecting phase and in the charging phase the actuator is powered according to an intervention instruction and the compliance value is monitored, wherein the compliance value is compared with a warning intervention value, wherein, when the warning intervention value is exceeded, the intervention instruction is started that is selected from the group comprising: interruption of a charging current through the robot-side charging interface; triggering an audio alarm; triggering a visual alarm; communicating an alarm state to the vehicle or to a higher level management system; triggering a mechanical breakout release; and retraction of the robot-side charging interface from the vehicle-side charging interface.

20. Method according to claim 19, wherein in the charging phase the actuator is powered according to the charging instruction at the beginning of the charging phase, and the actuator is idling when the compliance value is between the first charging intervention value and the lower second charging intervention value.

21. Method according to claim 19, wherein according to the charging instruction the actuator is powered to bring the compliance value between the first charging intervention value and the second charging intervention value when the compliance value exceeds the first charging intervention value or comes below the second charging intervention value.

22. Method according to claim 18, wherein
in the positioning phase, the warning intervention value is higher than the positioning intervention value;
in the connecting phase, the warning intervention value is higher than the connecting intervention value; and/or—
in the charging phase, the warning intervention value is higher than the first charging intervention value or lower than second charging intervention value, or the warning intervention value has a first warning intervention value higher than the first charging intervention value, and a second warning intervention value lower than the second charging intervention value.

\* \* \* \* \*